United States Patent
Rawlins

(10) Patent No.: US 11,033,806 B2
(45) Date of Patent: Jun. 15, 2021

(54) METHODS AND SYSTEMS FOR DESIGNING AND MANUFACTURING MATHEMATICALLY FAIR N-SIDED DICE

(71) Applicant: University of Alaska Anchorage, Anchorage, AK (US)

(72) Inventor: Katherine Rawlins, Anchorage, AK (US)

(73) Assignee: University of Alaska Anchorage, Anchorage, AK (US)

(*) Notice: Subject to any disclaimer, the term of this patent is extended or adjusted under 35 U.S.C. 154(b) by 545 days.

(21) Appl. No.: 15/927,840

(22) Filed: Mar. 21, 2018

(65) Prior Publication Data

US 2018/0304147 A1    Oct. 25, 2018

Related U.S. Application Data

(60) Provisional application No. 62/474,319, filed on Mar. 21, 2017.

(51) Int. Cl.
*A63F 9/04* (2006.01)
*B29C 45/76* (2006.01)
(Continued)

(52) U.S. Cl.
CPC ............ *A63F 9/0415* (2013.01); *B29C 45/37* (2013.01); *B29C 45/74* (2013.01); *B29C 45/76* (2013.01); *G06F 30/00* (2020.01); *G06F 30/20* (2020.01); *A63F 2009/0424* (2013.01); *A63F 2009/0428* (2013.01); *A63F 2009/0433* (2013.01);
(Continued)

(58) Field of Classification Search
CPC ............ A63F 9/0415; A63F 2009/0435; A63F 2009/0424; A63F 2009/0428; A63F 2009/0433; A63F 2009/0497; G06F 30/00; G06F 30/20; B29C 45/37; B29C 45/76; B29C 45/74; B29C 33/3835; B29L 2031/5209; B29L 2031/772
See application file for complete search history.

(56) References Cited

U.S. PATENT DOCUMENTS 4,546,978 A * 10/1985 David .................. A63F 9/0415
273/146
5,918,881 A * 7/1999 Kirby .................. A63F 9/0415
273/146

(Continued)

OTHER PUBLICATIONS

"D11 Sphere Dice" The Magic Shop (https://www.shapeways.com/product/HWQ8S2EUF/d11-sphere-dice), Mar. 6, 2015 (Year: 2016).*

(Continued)

*Primary Examiner* — Michael M. Robinson
(74) *Attorney, Agent, or Firm* — Ballard Spahr LLP

(57) ABSTRACT

Methods and systems for designing and manufacturing a mathematically fair N-sided die are disclosed. An example method can comprise selecting an irregular polyhedron to serve as a die, and determining a center of mass of the selected irregular polyhedron die. In an aspect, a size of each face of the irregular polyhedron can be selected such that a solid angle subtended by each face from the center of mass of the selected irregular polyhedron can be equal. In an aspect a system comprising an injection molding apparatus can be used to form the die.

18 Claims, 24 Drawing Sheets

(51) Int. Cl.
  *B29C 45/74* (2006.01)
  *B29C 45/37* (2006.01)
  *B29C 33/38* (2006.01)
  *B29L 31/52* (2006.01)
  *B29L 31/00* (2006.01)
  *G06F 30/00* (2020.01)
  *G06F 30/20* (2020.01)

(52) U.S. Cl.
  CPC ............... *A63F 2009/0435* (2013.01); *A63F 2009/0497* (2013.01); *B29C 33/3835* (2013.01); *B29L 2031/5209* (2013.01); *B29L 2031/772* (2013.01)

(56) References Cited

U.S. PATENT DOCUMENTS

| | | | | |
|---|---|---|---|---|
| 5,957,452 | A * | 9/1999 | Patton | A63F 9/0415 273/146 |
| 6,926,275 | B1 * | 8/2005 | Zocchi | A63F 9/04 273/146 |
| 2006/0113710 | A1 * | 6/2006 | Bemis | B29C 45/13 264/328.8 |
| 2017/0333782 | A1 * | 11/2017 | Fjelstad | A63F 9/0415 |

OTHER PUBLICATIONS

"Individual d3, d5, d7, d9, and d11" Mathartfun.com, Jun. 4, 2016. (Year: 2016).*

* cited by examiner

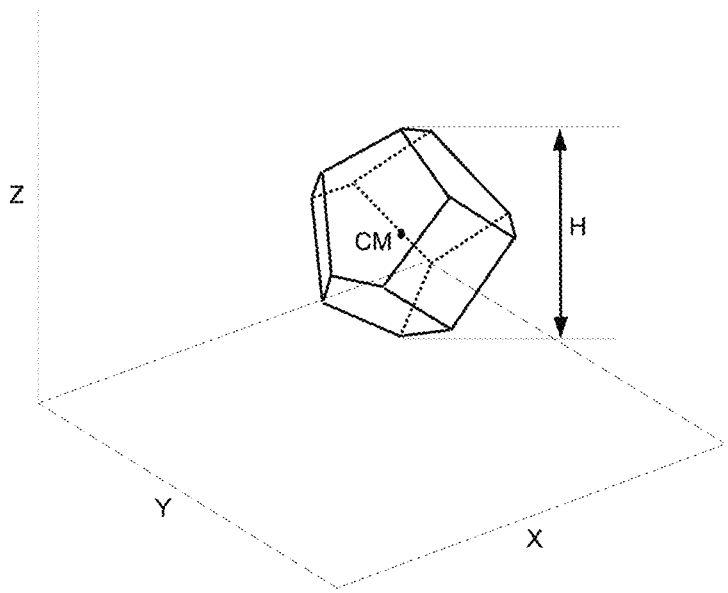
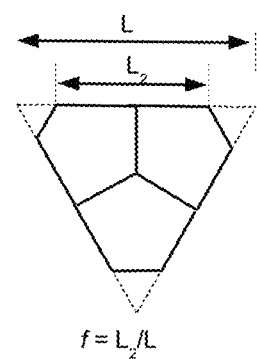
FIG. 11A
FIG. 11B

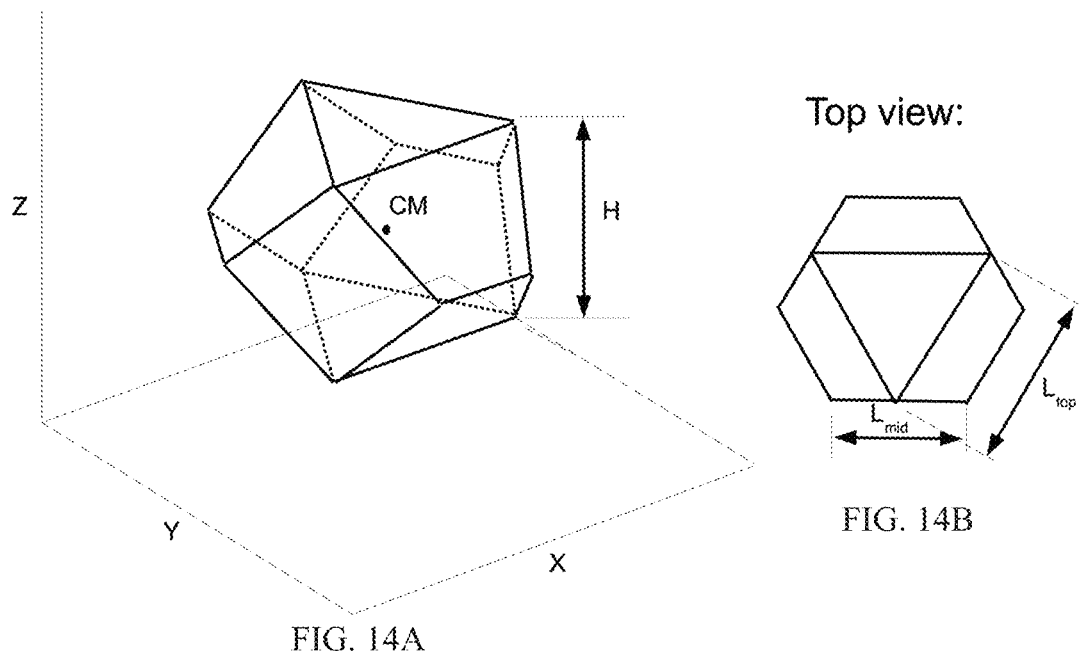
FIG. 14A
FIG. 14B
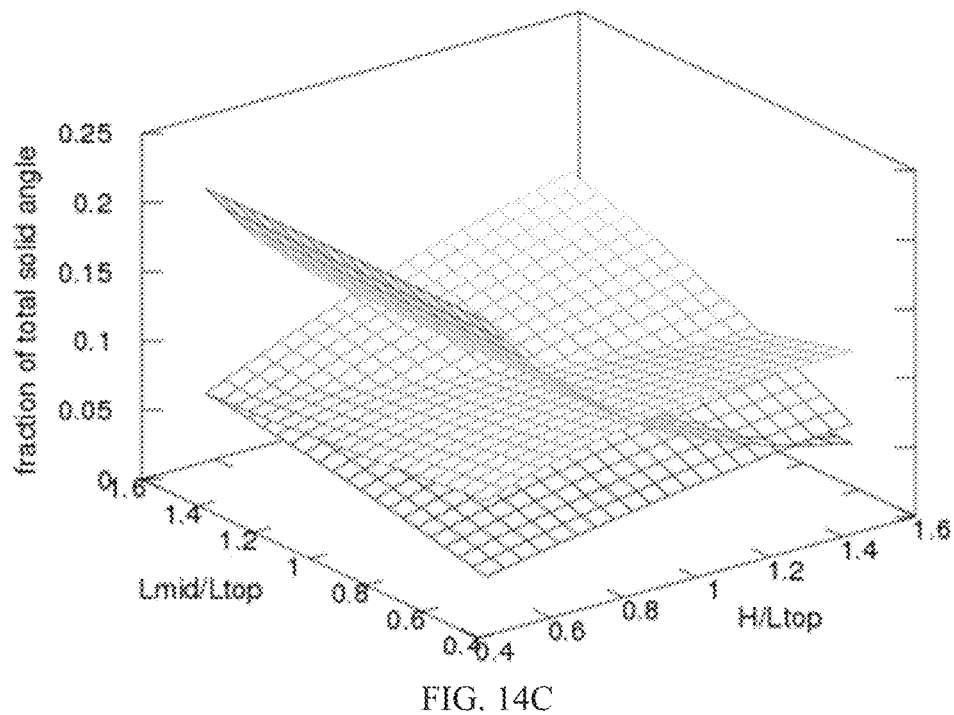
FIG. 14C

METHODS AND SYSTEMS FOR DESIGNING AND MANUFACTURING MATHEMATICALLY FAIR N-SIDED DICE

CROSS REFERENCE TO RELATED PATENT APPLICATION

This application claims the benefit of the filing date of U.S. Provisional Patent Application No. 62/474,319, filed on Mar. 21, 2017, which is incorporated by reference herein in its entirety.

BACKGROUND

The probability of landing on any side of a thrown regular polyhedral die of uniform density is the same for all sides, because all sides of a regular polyhedron have the same shape, size, and spatial relationship to the center of mass of the die. For example, a four-sided tetrahedral die, a six-sided cubical die, and an eight-sided octahedral die will land on any side with equal probability. In a typical irregular polyhedron, by contrast, the probability of landing on a side varies from one side to another. There is therefore a need for methods and systems to design polyhedral dice of an arbitrary number of sides that can land with equal probability on any side.

SUMMARY

It is to be understood that both the following general description and the following detailed description are exemplary and explanatory only and are not restrictive. Provided are methods and systems related to the design and manufacturing of mathematically fair N-sided dice.

In an aspect, provided is a method for designing a five-sided die. The method can comprise forming a square pyramid, wherein the square pyramid can comprise a square base and four triangle sides. In an aspect, a length between an apex of the square pyramid and a center of the square base can be 1.674875 times a side length of the square base.

In another aspect, provided is a method for making a five-sided die. The method can comprise forming a triangular prism, wherein the triangular prism can comprise two identical triangle end-caps and three rectangle sides. In an aspect, the two triangle end-caps can be equilateral triangles, and a length between the two triangle end-caps can be 0.533573 times a side length of one of the triangular end-caps.

In another aspect, provided is a method for making a seven-sided die. The method can comprise forming a pentagonal prism, wherein the pentagonal prism can comprise two identical pentagon end-caps and five rectangular sides. In an aspect, the two pentagon end-caps can be regular pentagons, and a length between the two pentagon end-caps can be 1.506038 times a side length of one of the regular pentagonal sides.

In still another aspect, an n-gonal prism having n+2 sides. The prism can be formed from two n-gonal end caps, and n equally sized rectangular sides, as described above with respect to the triangular prism and the pentagonal prism.

In another aspect, provided is a method for making a die wherein the number of sides is 3n, where n is an integer greater than or equal to three. The method can comprise forming an elongated double pyramid by forming a central part of the shape from a prism formed by an n-sided polygon, attaching an upward-pointing n-cornered pyramid to the upper face of the prism, and attaching a downward-pointing n-cornered pyramid to the lower face of the prism. In an aspect, a triangular prism and triangular pyramids can comprise the die's shape, in which the height of the central prism is 0.24819 times the length of the sides of the triangles, and the height of the upper and lower pyramids is dictated by aesthetic preference. In a further aspect, a pentagonal prism and pentagonal pyramids can comprise the die's shape, in which the height of the central prism is 0.520506 times the length of the sides of the pentagons, and the height of the upper and lower pyramids is dictated at least partially by aesthetic preference.

In another aspect, provided is a method for making a seven-sided die. The method can comprise forming a four-sided base with each vertex of the base joined to two additional corresponding vertices above the base, forming four triangular sides. In an aspect, the base can be a square, and the two additional vertices, which define the remainder of the die's shape, can be separated from the base by a distance of 1.612202 times a length of the sides of the square base and separated from each other by a distance of 1.011631 times the length of the sides of the square base. In a further aspect, the base can be a rhombus, and the two additional vertices, which define the remainder of the die's shape, can be directly above two opposite corners of the base forming an edge having a length of 1.397164 times the length of the sides of the rhombus base and separated from the base by a distance of 1.019692 times the length of the sides of the rhombus base from one another.

In another aspect, provided is a method for making a nine-sided die. The method can comprise forming a polyhedron having nine faces (an enneahedron) from three pentagons having tips converging at an upper vertex forming an upper point of the die, three pentagons in mirror image with tips converging at a lower vertex opposite to the upper vertex, forming a lower point of the die, the pentagons forming the upper point of the die can be connected to the pentagons forming the lower point of the die by three rhombi. In an aspect, the three rhombi can join a plurality of sides of the upper point and a plurality of sides of the lower point. The diagonal width of each of the rhombus sides can be an arbitrary fraction of the maximum possible width if the equatorial side of the pentagons above and below are reduced to zero length, thereby, in effect, transforming the pentagons into quadrilaterals. In an aspect, the diagonal width of the rhombus sides can be 0.6 times the maximum rhombus width, and the distance between the upper and lower points of the enneahedron can be 0.89860 times a maximum rhombus width.

In another aspect, provided is a method for making a ten-sided die. The polyhedron (a decahedron) can be formed from two square faces and eight pentagonal faces. In an example, the two square faces can be disposed opposite one another. A length of each side of the square faces can be designated as L, and an overall height H can be designated as a distance between the two square faces. In an aspect, a ratio H/L is 1.49535. Each of the pentagonal faces is congruent, allowing the angle at which the pentagonal faces extend from vertical to be arbitrary.

In another aspect, provided is a method for making an eleven-sided polyhedron (a hendecahedron). The eleven sided polyhedron can be formed from two triangular faces, three rhombus faces, and six quadrilateral faces. The two triangular faces form the top and bottom caps of the shape, and each edge of the triangles is one edge of one quadrilateral face, whose opposite edge is at the equator of the shape. The side edges of the quadrilaterals create rhombus faces.

In another aspect, provided is a method for making a variety of odd-sided dice. One example includes a double-pyramid, preferably having an even number of faces, which is truncated on one side to form one additional face. The shared base of each of the two pyramids can be a regular polygon with any number of sides, n. A first pyramid can extend upward from the base to meet at an upper tip, having n triangular faces. A second pyramid can extend downward from the shared base towards a lower tip, terminating at edges and forming a lower n-sided polygonal face. The overall shape could contain n triangular faces from the upper pyramid, n quadrilateral faces from the truncated lower pyramid, and one n-sided polygonal face where the truncation occurs, resulting in a total of (2n+1) faces.

In a further aspect, provided is a method of designing a mathematically fair irregular polyhedral die. The method can comprise selecting an irregular polyhedron to serve as a die, and determining a center of mass of the selected irregular polyhedron die. In an aspect, the dimensions of the irregular polyhedron can be selected such that a solid angles subtended by each face from the center of mass of the selected irregular polyhedron can be equal.

In still another aspect, provided is a system for manufacturing one or more of the above-mentioned dice. The system can comprise a plurality of injection molds, each being suitable for manufacturing a specifically-shaped die. Using a given injection mold of the plurality of injection molds, an injection mold apparatus can receive a quantity of solid polymer material, heat the material with a heating element until the material is molten, and, with a jet coupled to the heating element, inject the molten material into the given injection mold.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 11A illustrates an example nine sided die;
FIG. 11B illustrates a top view of an example nine sided die;
FIG. 14A illustrates an example eleven-sided die;
FIG. 14B illustrates a top view of an example eleven-sided die;
FIG. 14C illustrates a fraction of solid angle subtended by triangle, rhombus, and quadrilateral faces of an eleven-sided die.

DETAILED DESCRIPTION

Figure 1:
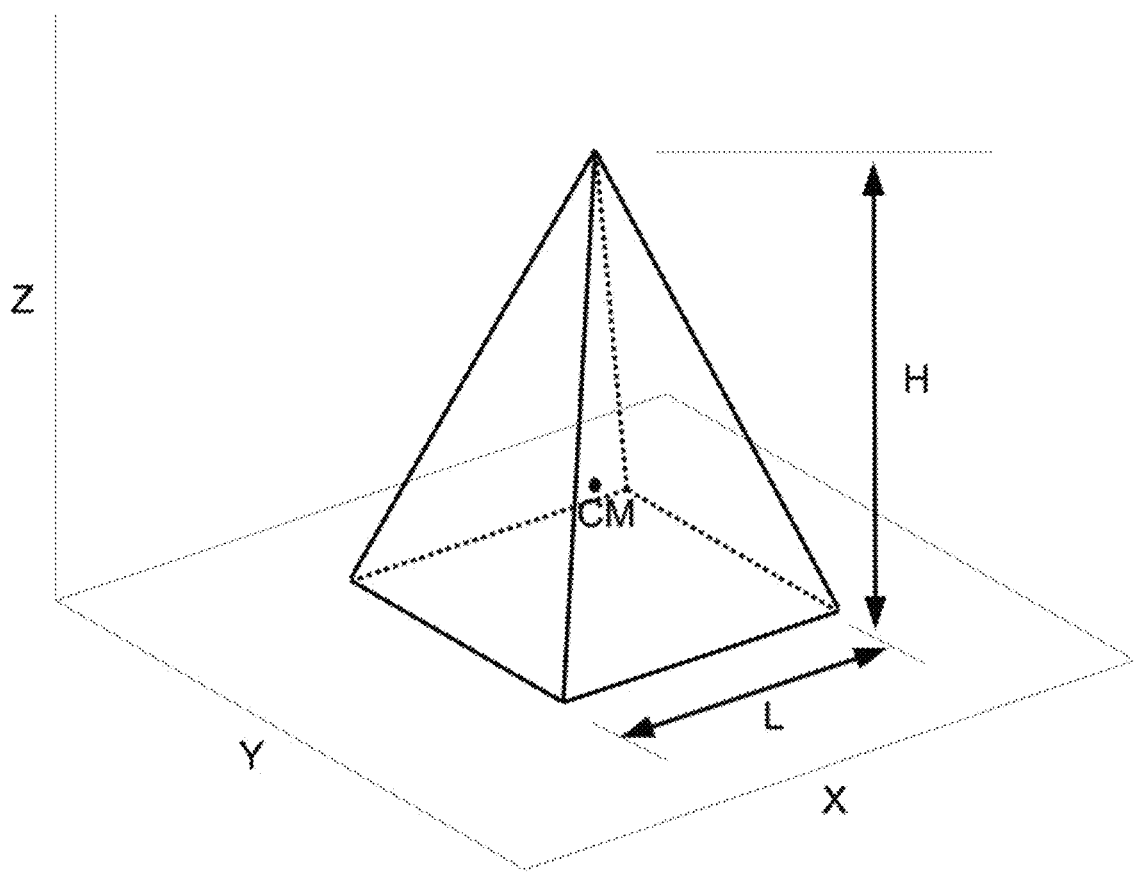
FIG. 1 illustrates an example five-sided die.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to mathematically fair N-sided dice. In an aspect, provided is a method of designing a mathematically fair irregular polyhedral die. The method can comprise selecting an irregular polyhedron to serve as a die, and determining a center of mass of the selected irregular polyhedron. In an aspect, a size of each face of the irregular polyhedron can be selected such that a solid angle subtended by each face from the center of mass of the selected irregular polyhedron can be equal. In an aspect, the disclosed methods can be applied to any polyhedron with N flat faces. As an example, the method can be used to design five sided dice, seven sided dice, nine sided dice, ten sided dice, eleven sided dice, fifteen sided dice, and the like. In an aspect, a die can have sharp edges, smooth edges, beveled edges, rounded edges, and the like. The polyhedral die can be solid or hollow, and can be uniformly or non-uniformly dense.

In an aspect, a face down style can be used for numbering and/or labeling of a die. For example, a number can be printed on each face of a die and the number of a landing face (i.e., the face of the die that is in contact with the table or other surface on which the die was rolled) can be the number that was "thrown." Using this method, the user needs to pick up the die to read the "thrown" number. In another aspect, a face up style can be used for numbering and/or labeling of a die. For example, a number can be printed on or around a face, a corner, or an edge of a die. The number opposite of the landing face can be the number that was "thrown". When using the face up style, the user does not need to pick up the die to read the "thrown" number.

In an aspect, a mathematically fair N-sided die can be used for games of chance such as casino-style games, board games, role-playing games, and the like. In an aspect, a mathematically fair N-sided die can be used for traditional games with different dynamics due to different die-roll possibilities. In another aspect, a mathematically fair N-sided die can be used for educational purpose such as teaching about probability, solid angles, geometry, and the like.

In an aspect, a mathematically fair N-sided die can comprise a square pyramid, wherein the square pyramid can comprise a square base with a side length L, and a height H from the base to a pyramid tip (measured orthogonally from the base), as shown in FIG. 1. FIG. 1 also shows a dot representing a center of mass of the square pyramid disposed ¼ of way up from the square base to the pyramid tip at an origin of a coordinate system. In an aspect, four triangular walls of the square pyramid can all be symmetrical and can each subtend a solid angle $\Omega_{triangle}$, whereas the square base subtends a solid angle $\Omega_{square}$. The solid angle of each of the faces (i.e., the four triangular walls and the square base) with respect to the center of mass origin is equal and set to $4\pi/5$, that is: $\Omega_{triangle}=\Omega_{square}=4\pi/5$. This calculation is discussed in Richard J. Mathar, Solid Angle of a Rectangular Plate, Technical Note, available at http://www.mpia-hd.mpg.de/mathar/public/mathar20051002.pdf, the entirety of which is incorporated by reference herein. For a rectangle of sides a and b which is offset perpendicularly from the origin by a distance, d, at the center of mass, a solid angle subtended is given by the formula:

$$\Omega(a, b, d) = 4\arccos\sqrt{\frac{1+\alpha^2+\beta^2}{(1+\alpha^2)(1+\beta^2)}}$$

where $$\alpha = a/(2d), \text{ and } \beta = b/(2d)$$

In this scenario, sides of a square are a=b=L, and the distance from a center of the square to a center of mass is d=H/4. For these values of a, b, and d, and setting n equal to $4\pi/5$, the solid angle formula can be simplified to:

$$\Omega(L, H) = 4\arccos\sqrt{\frac{1+2\alpha^2}{(1+\alpha^2)^2}} = (4\pi)/5 \text{ where } = \alpha = L/(H/2)$$

$$\frac{1+2\alpha^2}{(1+\alpha^2)^2} = \cos^2(\pi/5) = \text{``A'}$$

$$1 + 2\alpha^2 = A(1+\alpha^2)^2$$

$$(1-A) + (2-2A)\alpha^2 + (-A)\alpha^4 = 0$$

$$\alpha^2 = \frac{-(2-2A) \pm \sqrt{(2-2A)^2 - 4(-A)(1-A)}}{2(-A)}$$

$$(L/(H/2))^2 = \frac{(1-A) + \sqrt{(1-A)^2 - (A)(A-1)}}{A}$$

$$(2L/H)^2 = \frac{(1-A) + \sqrt{(1-A)}}{A}$$

$$H/L = 2\sqrt{\frac{A}{(1-A) + \sqrt{1-A}}} = 2\sqrt{\frac{\cos 2(\pi/5)}{\sin 2(\pi/5) + \sin(\pi/5)}} = 1.674875$$

Therefore, a square pyramid with H/L=1.674875 can be selected as an irregular polyhedron for use as a mathematically fair die.

Figure 3:
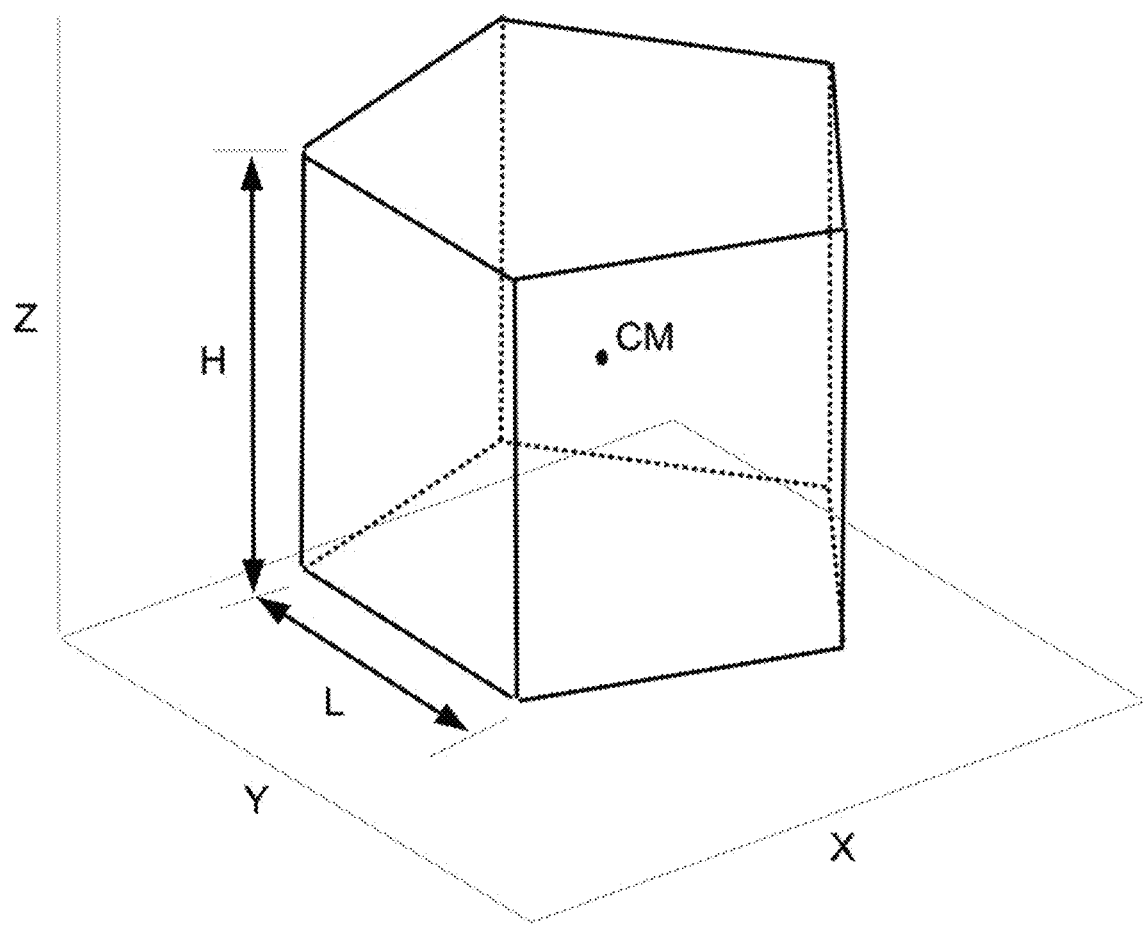
FIG. 3 illustrates an example seven-sided die.

In an aspect, a polygonal prism die can be made. A polygonal prism die can comprise a pair of opposite equilateral regular polygon end-caps (e.g., a top cap and a bottom cap) wherein a side length of each side of the equilateral regular polygons is L. The pair of opposite equilateral regular polygon end-caps can be separated from each other by rectangular sides with height, H. A number of rectangular sides can be equal to a number of sides of the equilateral regular polygons, such that equilateral regular n-gons are separated by n rectangular sides. Each rectangular side has dimensions L×H. Accordingly, since the equilateral regular polygons have a number of sides n, the prism polyhedron has a total number of faces N=n+2. For example, a triangular prism (n=3) has five sides, as shown in FIG. 1, a square prism (n=4) has six sides, a pentagonal prism (n=5) has seven sides, as shown in FIG. 3, and so on. Accordingly, the N faces of the prism are: two polygons (the top cap and the bottom cap) which each subtend a solid angle of $\Omega_{cap}$, and the n rectangular walls which each subtend a solid angle of $\Omega_{rectangle}$. When $\Omega_{rectangle}=\Omega_{cap}=4\pi/N$, any of the faces can be selected and the solid angle of the respective selected face can be set to $4\pi/N$ to solve for the fairness ratio H/L.

Figure 2:
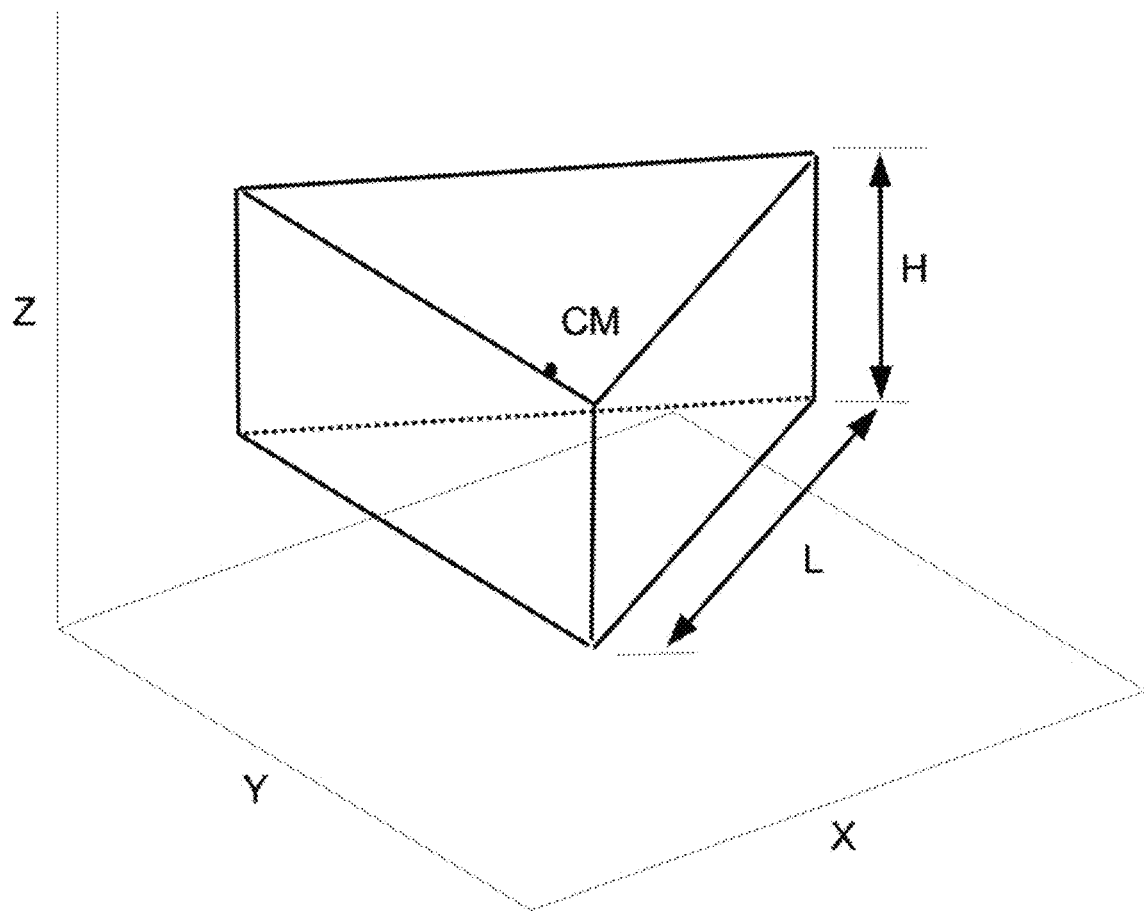
FIG. 2 illustrates another example five-sided die.

As shown in FIG. 1 and FIG. 2, a center of mass (depicted as a dot) can be disposed halfway between a top cap and a bottom cap at an origin of a coordinate system. In an aspect, because a center of mass of this shape is halfway from top to bottom, regardless of the total number of sides, each rectangular wall can be offset at its center from the origin by a distance d which is related to the edge length L and the number of sides of the polygon, n. Each face can have an "opening angle" from the center of $\theta_0=360°/n$, and the offset distance can be calculated using: $\tan(\theta_0)=(L/2)/d$, or $d=L/(2\tan(\theta_0/2))$. So, when: a=L, b=H, and $d=L/(2\tan(\theta_0/2))$, and setting the resulting solid angle equal to $4\pi/N$:

$$\Omega(a, b, d) = 4\arccos\sqrt{\frac{1+\alpha^2+\beta^2}{(1+\alpha^2)(1+\beta^2)}}$$

where $$\alpha = a/(2d), \text{ and } \beta = b/(2d)$$

$$4\arccos\sqrt{\frac{1+(L\tan(\theta_0/2)/L)^2+(H\tan(\theta_0/2)/L)^2}{(1+(L\tan(\theta_0/2)/L)^2)(1+(H\tan(\theta_0/2)/L)^2)}} = (4\pi)/(n+2)$$

Defining $B=\tan^2(\theta_0/2)$ and rearranging, this becomes:

$$\frac{1+B+B(H/L)^2}{(1+B)(1+B(H/L)^2)} = \cos^2(\pi/(n+2))$$

Defining $A=\cos^2(\pi/(n+2))$ and rearranging, this becomes:

$$1 + B + B(H/L)^2 = A(1+B)(1+B(H/L)^2)$$

$$1 + B - A(1+B) = [A(1+B) - 1]B(H/L)^2$$

$$H/L = \sqrt{\frac{1+B-A(1+B)}{(A(1+B)-1)B}}$$

The table below shows the results of the above calculation for a sample of n-sided polygonal prisms, each polygonal prism being an (n+2)-sided polyhedron (e.g., N=n+2). As an example, when n=4, the ratio H/L is 1.0, which results in a mathematically fair cube, as one skilled in the art would expect.

| n | N | $\theta_0 = 360°/n$ | $B = \tan^2(\theta_0/2)$ | $A = \cos^2(\pi/(n+2))$ | H/L |
|---|---|---|---|---|---|
| 3 | 5 | 120° | 3 | 0.65451 | 0.533573 |
| 4 | 6 | 90° | 1 | ¾ | 1.0 |
| 5 | 7 | 72° | 0.528764 | 0.81174 | 1.506038 |
| 6 | 8 | 60° | ⅓ | 0.85355 | 2.05977 |
| 7 | 9 | 51.429° | 0.231914 | 0.88302 | 2.66019 |
| 8 | 10 | 45° | 0.171573 | 0.90451 | 3.30494 |
| 9 | 11 | 40° | 0.132474 | 0.92063 | 3.99164 |
| 10 | 12 | 36° | 0.105573 | 0.93301 | 4.71808 |
| 11 | 13 | 32.727° | 0.086217 | 0.94273 | 5.48236 |

Figure 4:
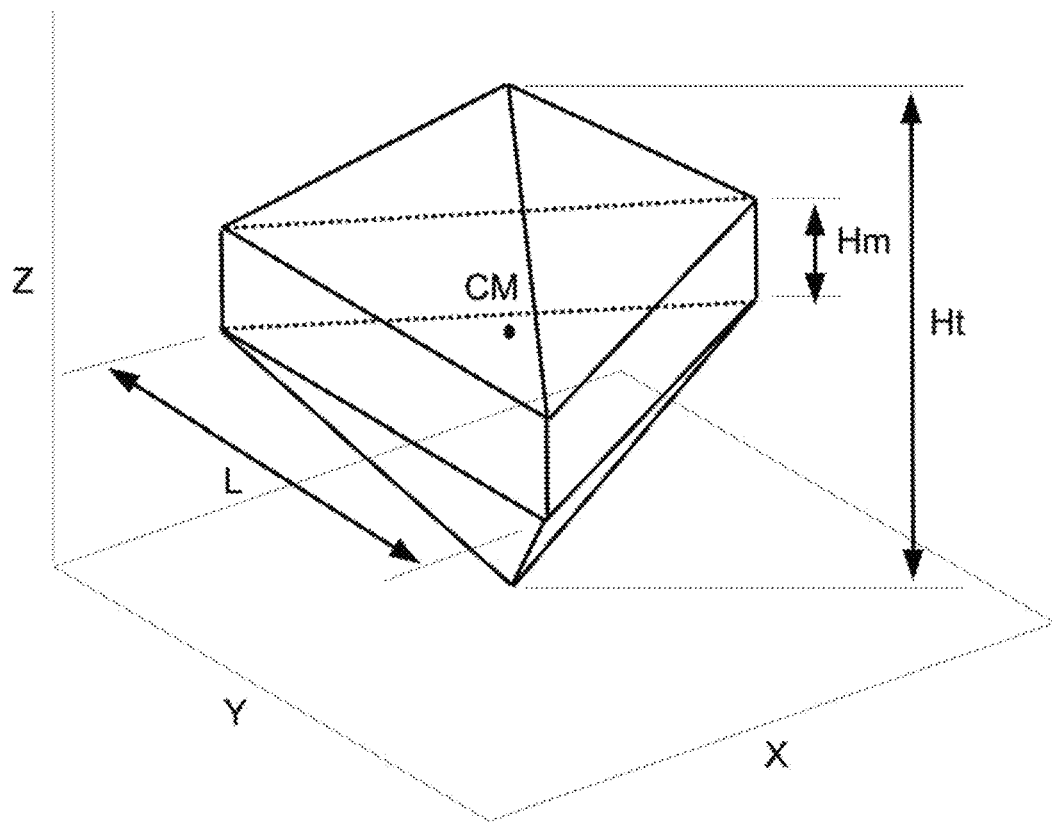
FIG. 4 illustrates an example nine-sided die formed from an elongated triangular double pyramid.
Figure 5:
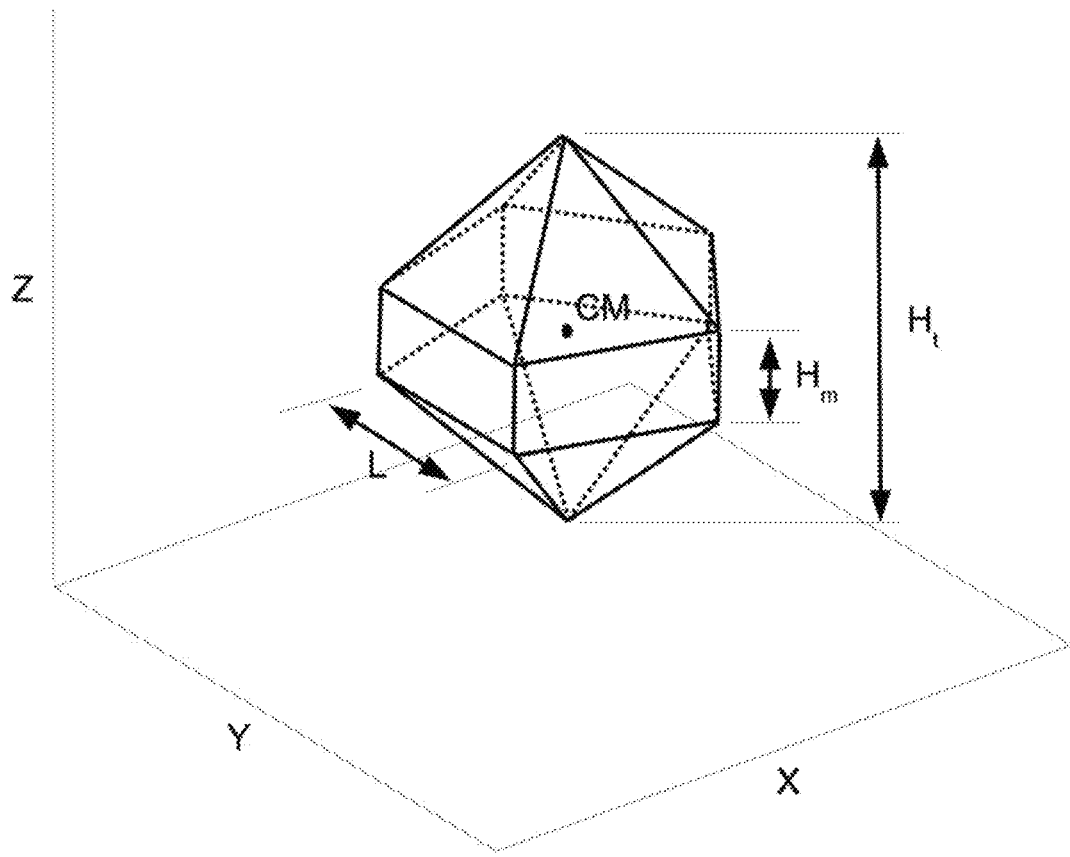
FIG. 5 illustrates an example fifteen-sided die formed from an elongated pentagonal double pyramid.

In another aspect, a die can be made in the shape of an "elongated double pyramid". This shape can comprise two central polygons each with n sides of length L (e.g., a triangle, a square, a pentagon, etc.) separated vertically by a distance $H_{mid}$, thereby forming a prism. The upper rim of said prism can form the base of an upward-pointing pyramid of n additional faces joining at an upper tip, and the lower rim of said prism can form the base of a downward-pointing pyramid of n additional faces joining at a lower tip. Each of the faces of the upper and lower pyramids can be congruent, and each of the rectangular faces can be congruent. An example of a nine-sided elongated double pyramid (n=3) is shown in FIG. 4, and an example of a fifteen-sided elongated double pyramid (n=5) is shown in FIG. 5. The total number of faces for each of the "elongated double pyramid polyhedrons is 3*n. Therefore, to achieve mathematical fairness, each of the rectangular faces in the middle of said dies must subtend a solid angle of $4\pi/(3n)$. When the faces of the pyramids are congruent, however, the height of each of the pyramids is irrelevant to the mathematical fairness of the polyhedral die, because all of the pyramid faces share the remaining solid angle equally regardless of their height.

In an aspect, the solid angle subtended by the rectangular walls is calculated in the same fashion as for a polygonal prism, discussed above, except the variable A in this aspect is set equal to $\cos^2(\pi/(3n))$:

$$H/L = \sqrt{\frac{1+B-A(1+B)}{(A(1+B)-1)B}}$$

The table below shows the results of the above calculation for a sample of n-sided elongated double pyramids

| n | N | $\theta_0 = 360°/n$ | $B = \tan^2(\theta_0/2)$ | $A = \cos^2(\pi/(3n))$ | $H_{mid}/L$ |
|---|---|---|---|---|---|
| 3 | 9 | 120° | 3 | 0.88302 | 0.24819 |
| 4 | 12 | 90° | 1 | 0.93301 | 0.39332 |
| 5 | 15 | 72° | 0.528764 | 0.95677 | 0.520506 |
| 6 | 18 | 60° | ⅓ | 0.96985 | 0.64146 |
| 7 | 21 | 51.429° | 0.231914 | 0.97779 | 0.75952 |
| 8 | 24 | 45° | 0.171573 | 0.98296 | 0.87597 |
| 9 | 27 | 40° | 0.132474 | 0.98652 | 0.99145 |
| 10 | 30 | 36° | 0.105573 | 0.98907 | 1.10627 |
| 11 | 33 | 32.727° | 0.086217 | 0.99096 | 1.22065 |

A method for computing the solid angle subtended by an arbitrary conical polygon shape, given a set of unit vectors $\{\vec{s}_1 \ldots \vec{s}_n\}$ pointing outwards towards a set of vertices is discussed in Oleg Mazonka, Solid Angle of Conical Surfaces, Polyhedral Cones, and Intersecting SphericalCaps, arXi v: 1205. 1396, and Van Oosterom and J. Strackee "The Solid Angle of a Plane Triangle", IEEE Trans. Biomed. Eng. BME-30(2), 125-126 (1983), both of which are herein incorporated by reference in their entirety. In an aspect, after defining any face of a polyhedron with a set of (x, y, z) coordinates for a set of vertices, the method can be used to compute a solid angle:

$$a^j = \vec{s}_{j-1} \cdot \vec{s}_j + 1$$
$$b_j = \vec{s}_{j-1} \cdot \vec{s}_j$$
$$c_j = \vec{s}_j \cdot \vec{s}_j + 1$$
$$d_j = \vec{s}_{j-1} \cdot (\vec{s}_j \times \vec{s}_{j+1})$$
$$\Omega = 2\pi - \sum \arctan \frac{d_j}{b_j c_j - a_j}$$

In an aspect, numerical techniques can be used on a polyhedral die design. In a fair-die problem, coordinates of a plurality of vertices of a die can depend on dimensions of the die (e.g., H/L). In an aspect, H/L for which $\Omega$ is equal for all faces can be calculated. In this technique, a series of H/L ratios can be used for each given shape, and solid angles of one or more faces of the given shape can be computed numerically. In an aspect, there can be one H/L for which solid angles of all faces are equal.

Figure 6C:
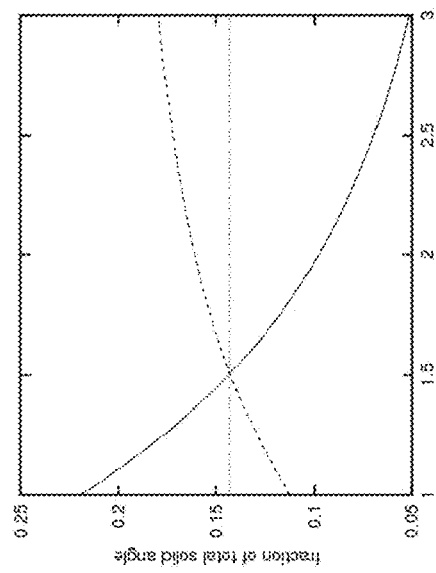
FIG. 6C illustrates a fraction of total solid angle subtended by different faces as a function of H/L for a pentagonal prism.
Figure 6B:
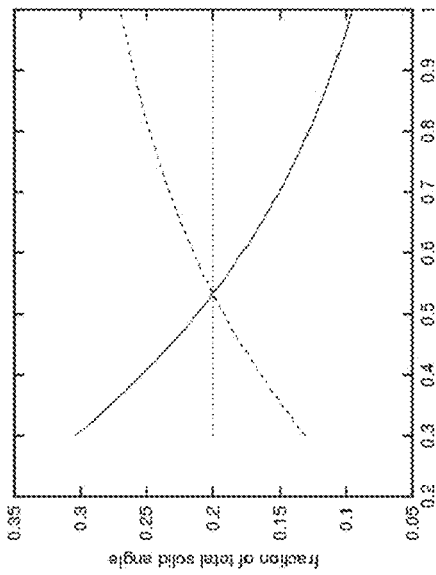
FIG. 6B illustrates a fraction of total solid angle subtended by different faces as a function of H/L for a triangular prism.
Figure 6A:
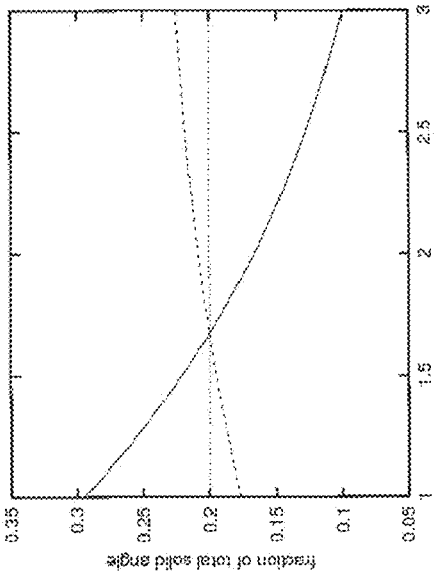
FIG. 6A illustrates a fraction of total solid angle subtended by different faces as a function of H/L for a square pyramid.

FIG. 6A illustrates a fraction of total solid angle subtended by different faces as a function of H/L for a square pyramid. FIG. 6B illustrates a fraction of total solid angle subtended by different faces as a function of H/L for a triangular prism. FIG. 6C illustrates a fraction of total solid angle subtended by different faces as a function of H/L for a pentagonal prism. Two curves on FIG. 6A, FIG. 6B and FIG. 6C represent two categories of faces on a die. For example, two curves on FIG. 6A represent a square base and a triangular wall for a square pyramid die. The intersection of the two curves shown in each of FIG. 6A and FIG. 6B correspond to a fractional solid angle 0.2 for a five-sided die. The intersection of the two curves shown in FIG. 6C corresponds to a fractional solid angle of 0.1428 (i.e., ⅐) for a seven sided die. Accordingly, the H/L ratio at the intersection point can be determined as a point that produces a mathematically fair polyhedron (i.e., a polyhedron having face sizes selected such that the solid angle subtended by each face is equal). The H/L ratios of the intersection points from FIGS. 6A, 6B, and 6C match the H/L ratio derived analytically for those three shapes. A similar analysis can successfully cross-check the $H_{mid}/L$ ratios calculated analytically for the elongated double pyramid shapes. This technique of finding where solid angle curves intersect can also be used for shapes for which there is not an analytical solution.

Figure 7:
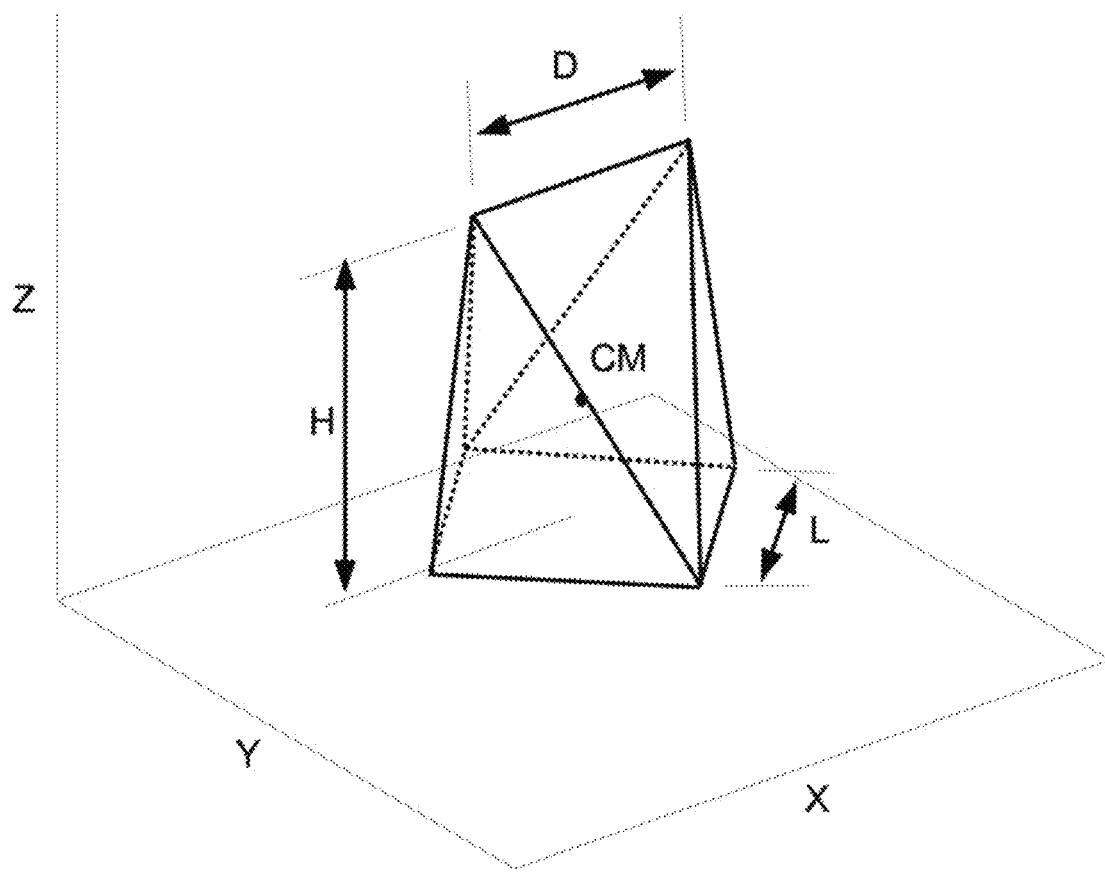
FIG. 7 illustrates an example seven-sided die with a square base.

FIG. 7 shows another example seven-sided polyhedral die. In an aspect, the seven-sided polyhedral die can comprise one square and six triangles, and can hereinafter be referred to as a "square-base tent." This shape comprises three descriptors: the sides of the square base L, the height of two tips H, and the distance between the two tips D. This shape contains three different kinds of faces: the square base, the four outer triangles, and the two inner triangles which are different. A center of mass (depicted as a dot) show in FIG. 7 can be computed by dividing the shape into three irregular tetrahedrons, and the center of mass can be placed at the origin of the coordinate system. In an aspect, setting a solid angle $\Omega$ subtended by one of the faces to $4\pi/7$ is no longer sufficient to ensure fairness, because there are three face shapes. Thus, the remaining solid angle can be shared by two other types of faces, not just one. If the solid angle $\Omega$ of two of the types of faces can be made to be simultaneously equal to $4\pi/7$, then a third type can share the remainder of the solid angle and all seven solid angles are equal. In another words, two solid angle equations are calculated for two unknowns (e.g., the ratios H/L and D/L).

Figure 9:
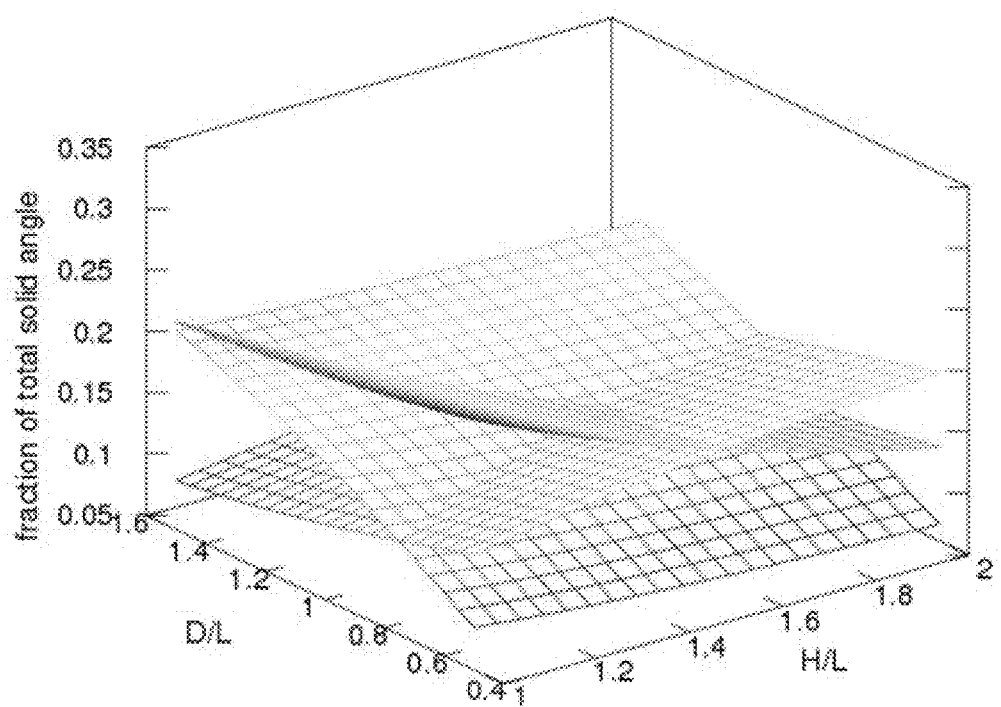
FIG. 9 illustrates a fraction of total solid angle subtended by end triangular faces, center triangular face, and a square base of a seven-sided die.

In an aspect, a matrix of possible H/L and D/L ratios is scanned over, and the solid angles subtended by each of the types of faces can be computed using the technique described above. FIG. 9 depicts a graph showing a fraction of a solid angle subtended by each face type (e.g., a square base, outer triangles, and inner triangles), as a function of both H/L and D/L. As an example, a mathematically "fair" value of H/L and D/L for the die shape depicted in FIG. 9 is the value where all three curves intersect and the fraction of the total solid angle is ⅐ or 0.1428. This point of intersection of the three planes depicted in FIG. 9 occurs where H/L=1.61220 and D/L=1.01163.

Figure 8:
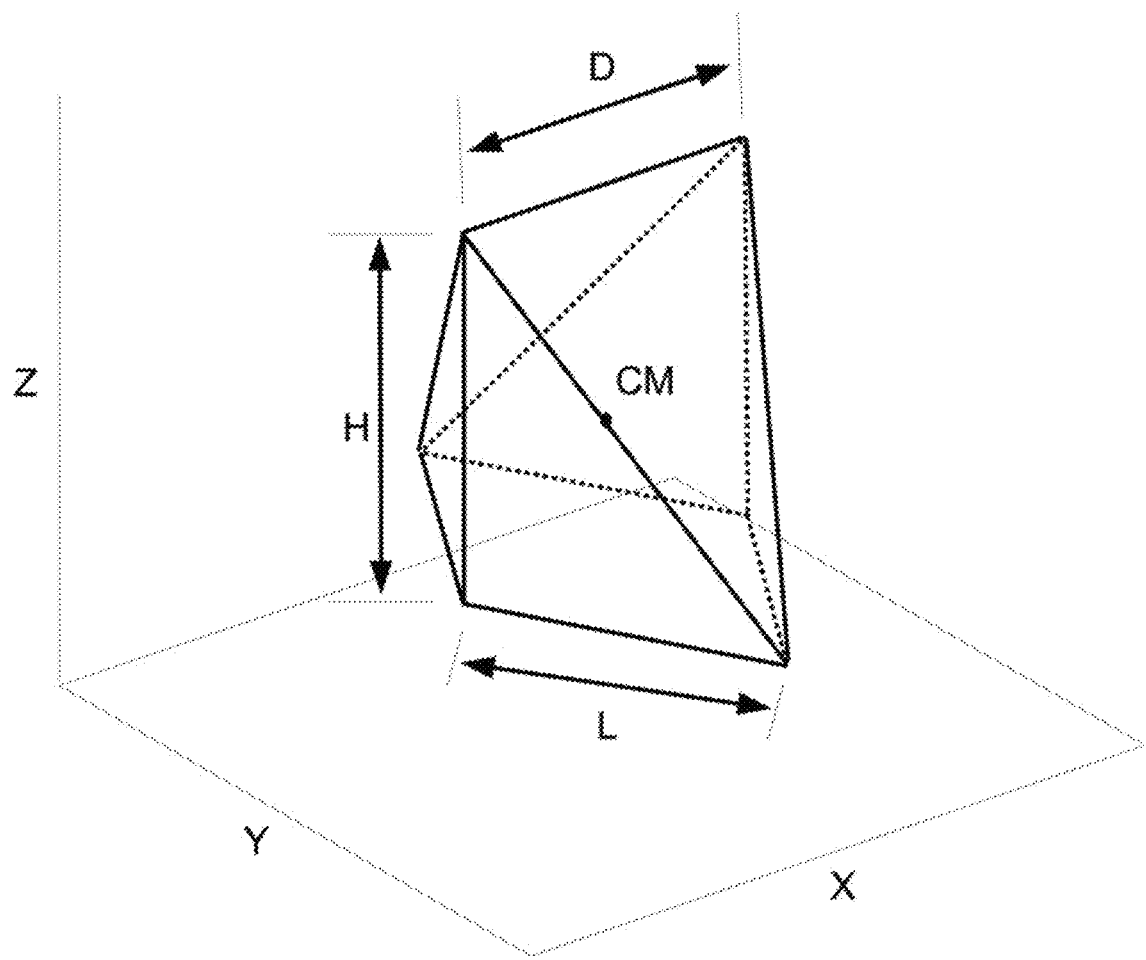
FIG. 8 illustrates an example seven-sided die with a rhombus base and two vertical edges.
Figure 10:
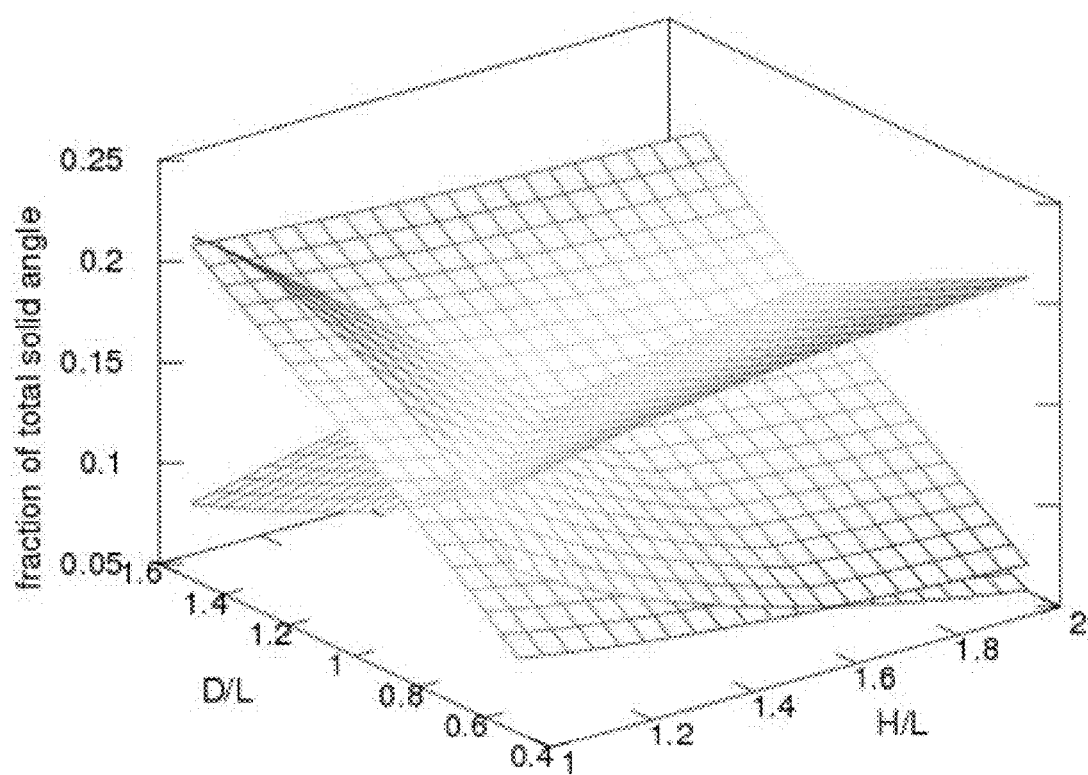
FIG. 10 illustrates a fraction of total solid angle subtended by end triangular faces, center triangular face, and a rhombus base of a seven-sided die.

FIG. 8 depicts another example seven-sided polyhedral die. In an aspect, the seven-sided polyhedral die can comprise one rhombus and six triangles. The shape of the seven-sided polyhedral die depicted in FIG. 8 is similar to the "square-base tent" shape described above, with the base being a rhombus instead of a square, and the two outer edges leading from the rhombus corners to the "tips" of the tent are vertical rather than slanted. Similar to the "square-base" tent, the "rhombus-base" tent described here is also defined by the length of the sides of the rhombus L, the height H, and the distance between the tips D, as depicted in FIG. 8. For this shape, a similar technique as above can be used to find the dimensions H/L and D/L, for which the solid angles subtended by the three types of faces are equal and ⅐$^{th}$ of the total. FIG. 10 depicts a graph showing the fraction of solid angle subtended by each face type (e.g., the rhombus base, the outer triangles, and the inner triangles), as a function of both H/L and D/L. As an example, the "fair" value of H/L and D/L for the die shape depicted in FIG. 10 is the value where all three curves intersect. For the die shaped as described above, the values required to achieve a mathematically fair die are therefore H/L=1.39716 and D/L=1.01969.

In an aspect, a nine-sided die can be made. A nine-sided polyhedron is called an enneahedron. There can be many nine-sided polyhedrons that can serve as a nine-sided die. As an example, a nine-sided die can be formed from six pentagons and three rhombus faces. Specifically, three pentagons having heads that can be joined at a bottom tip, three additional pentagons having heads that can be joined at a top tip, and three rhombus faces in the middle can join a plurality of sides of the pentagons that form the bottom tip with the pentagons that form the top tip, as shown in FIG. 11A.

Figure 12:
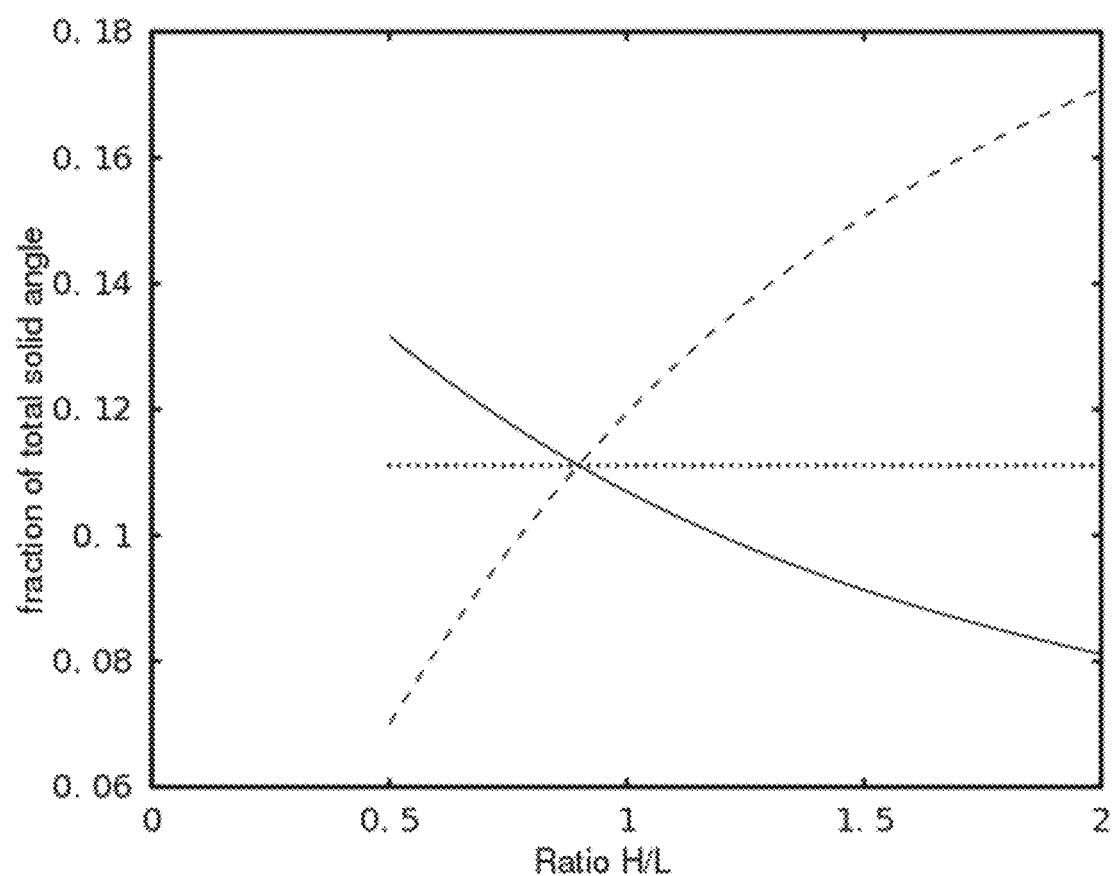
FIG. 12 illustrates a fraction of total solid angle subtended by one of the rhombus side faces on an enneahedron.

This shape, as shown in FIG. 11B, is trilaterally symmetric about its vertical axis. There are two degrees of freedom when constructing an enneahedron, the first being the relationship between height and width (H/L), and the second being the choice of how far outward on a triangle (as viewed from above) the bottom edge of the pentagons should lie ($L_{frac}$). Accordingly, L designates the horizontal width of one of the rhombus faces, from corner-to-corner, and H designates the total height of the enneahedron from the bottom tip to the top tip. The choice of the $L_{frac}$ value can be completely arbitrary or purposeful (e.g., based at least partially on aesthetic preferences). Given a specific choice of the value $L_{frac}$, a numerical calculation to determine solid angles subtended by each side of the enneahedron can scan a plurality of values of H/L, and for each value a fraction of solid angle subtended by one of the rhombus side faces can be calculated, as shown in FIG. 12. Where this curve crosses Ω=⅑ is the H/L ratio which results in a mathematically fair die. As a particular, non-limiting example, when $L_{frac}$ is chosen to be 0.6, the H/L ratio can be determined to be 0.89860.

Figure 13:
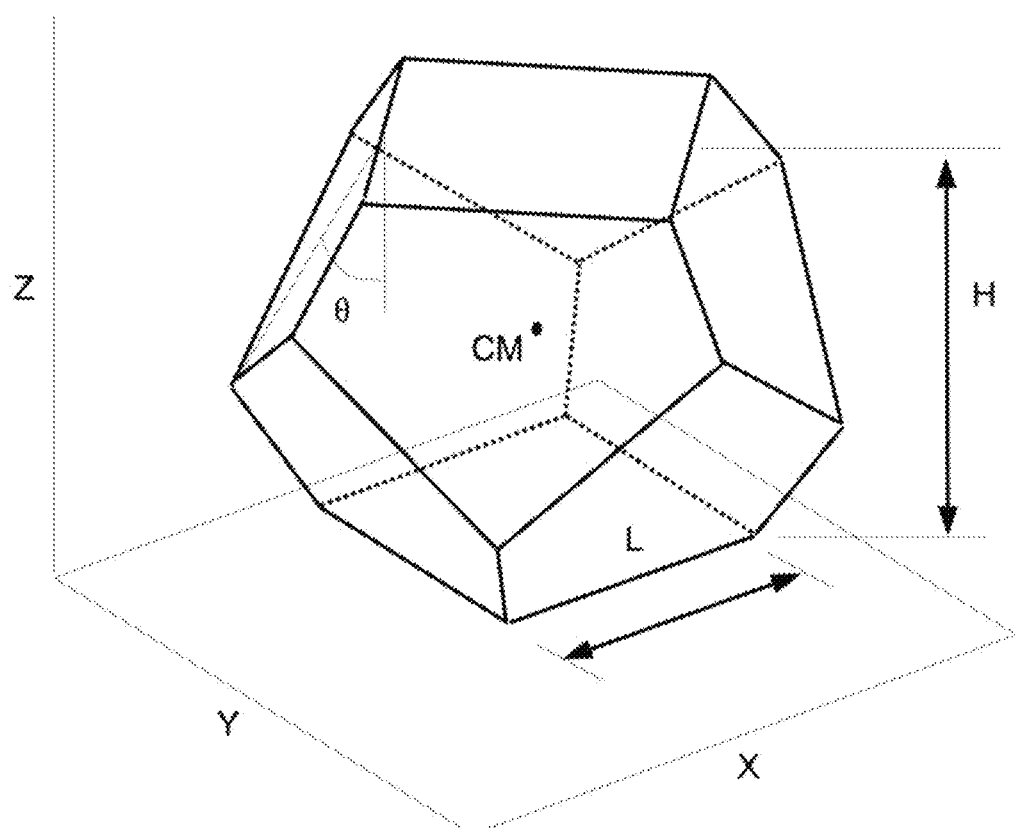
FIG. 13 illustrates an example ten-sided die.

FIG. 13 illustrates an example ten-sided polyhedron (decahedron) that can be selected as a ten-sided die. As shown in FIG. 13, the decahedron can be formed from two square faces and eight pentagonal faces. In particular, the two square faces are disposed opposite one another. A length of each side of the square faces can be designated as L, and an overall height H can be designated as a distance between the two square faces. For the decahedron to be mathematically fair, each of the ten faces subtends a solid angle of 4π/10. The solid angle of each of the two square faces on the top and bottom can be computed analytically from H and L, and it can be set to 4π/10 with the fairness H/L ratio computed similarly as was done for the square pyramid, discussed above. The calculation is identical to that described earlier for the square pyramid, except that for the decahedron the distance of the square's offset from the center is d=H/2 (instead of d=H/4, as for the square pyramid), and the "A" parameter is $\cos^2(\pi/10)$ (instead of $\cos^2(\pi/5)$, as for the square pyramid). For the decahedron, the fairness ratio H/L is 1.49535. When each of the pentagonal faces is congruent, the angle at which the pentagonal faces extend from vertical (depicted as angle θ in FIG. 13) is irrelevant to the mathematical fairness of the polyhedron, because all eight of the pentagonal faces can share the remaining solid angle Ω left by the squares. In such a case, the angle chosen can be completely arbitrary or it can be purposeful (e.g., to make the shape regular-looking and aesthetically pleasing).

FIG. 14A illustrates an example "hendecahedron," an eleven-sided polygon, that can be selected as an irregular polygon for use as a mathematically fair die. FIG. 14B illustrates a top view of an example "hendecahedron." The eleven sided polyhedron is formed from two triangular faces, three rhombus faces, and six quadrilateral faces. The two triangular faces form the top and bottom caps of the shape, and each edge of the triangles is one edge of one quadrilateral face, whose opposite edge is at the equator of the shape. The side edges of the quadrilaterals create rhombus faces. A length of each side of the triangular faces is designated L, a width of the rhombus faces at the midpoint is designated $L_{mid}$, and an overall height of the polyhedron between the top and bottom triangular faces is designated H. Because three descriptors (i.e., L, $L_{mid}$, and H) are used to describe this polyhedron, two ratios are needed to establish mathematical fairness. The fraction of solid angle subtended by all three types of faces (i.e., the triangles, the rhombi, and the quadrilaterals) can be computed as a function of $L_{mid}$/L and H/L using computational methods described above, and the intersection of all three curves indicates a ratio resulting in equal solid angles. A graph showing the fraction of solid angle subtended by all three types of faces (i.e., the triangles, the rhombi, and the quadrilaterals) computed as a function of $L_{mid}$/L and H/L as described above is shown in FIG. 14C. For the hendecahedron, a ratio $L_{mid}$/L can be established such that $L_{mid}$/L=1.01380 and a H/L ratio can be established such that H/L=1.03177.

Figures 15A, 15B:
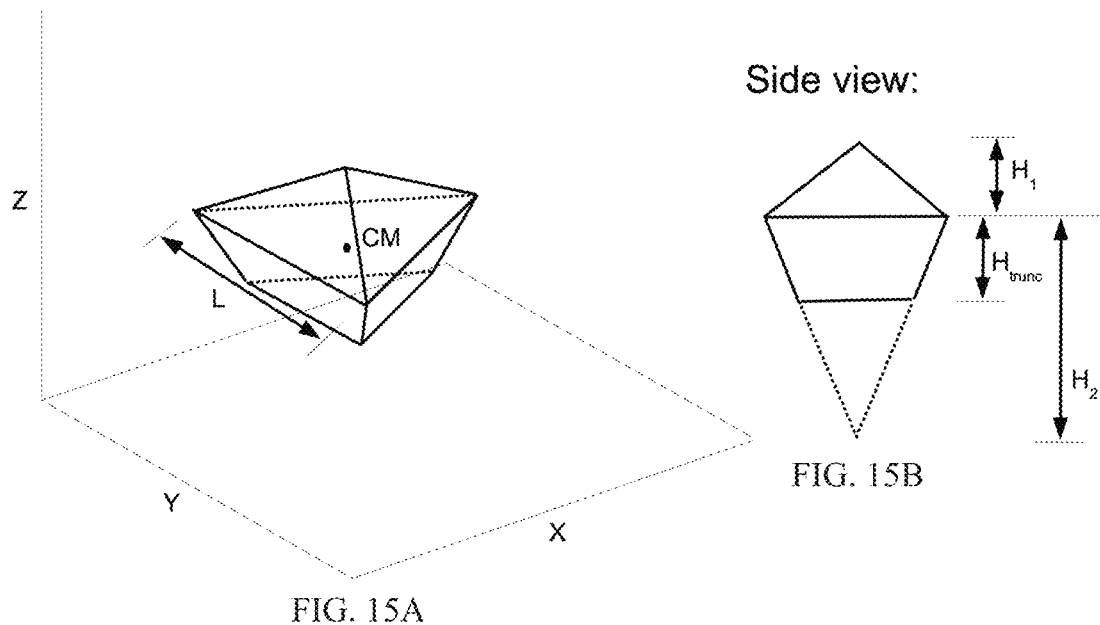
FIG. 15A illustrates an example seven-sided die formed from a truncated triangular double pyramid.
FIG. 15B illustrates a top view of an example seven-sided die formed from a truncated triangular double pyramid.
Figures 16A, 16B:
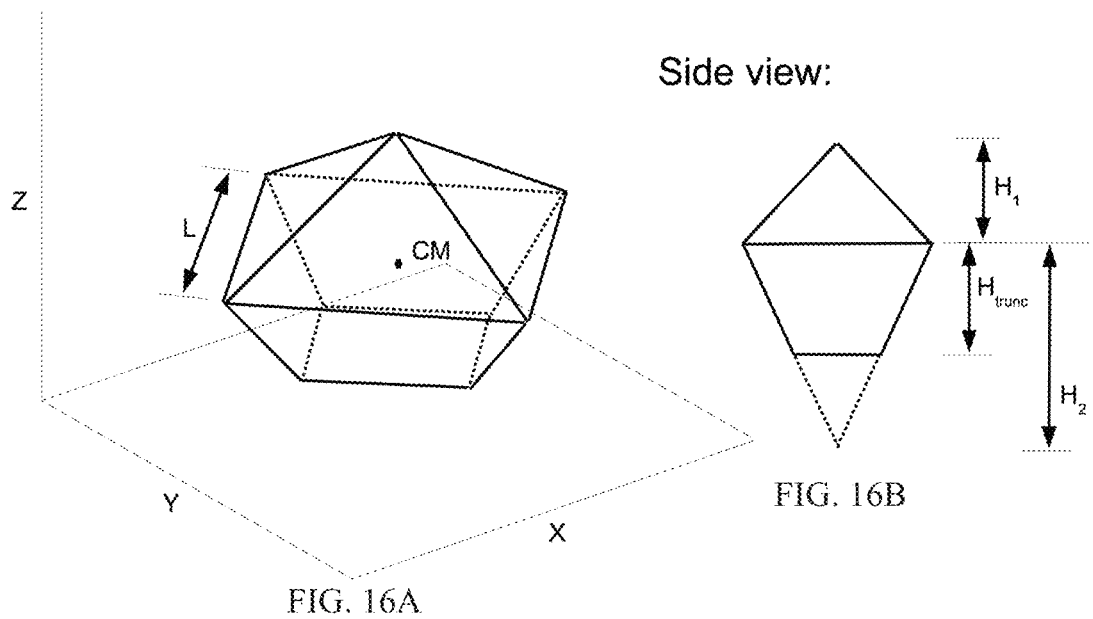
FIG. 16A illustrates an example nine-sided die formed from a truncated square double pyramid.
FIG. 16B illustrates a top view of an example nine-sided die formed from a truncated square double pyramid.
Figures 17A, 17B:
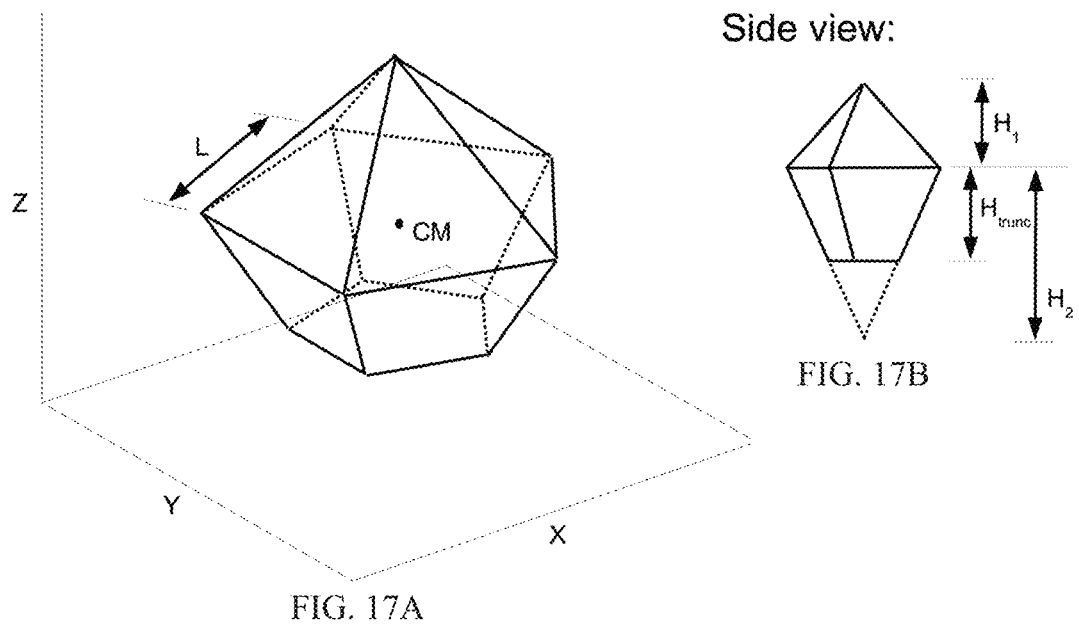
FIG. 17A illustrates an example eleven-sided die formed from a truncated pentagonal double pyramid.
FIG. 17B illustrates a top view of an example eleven-sided die formed from a truncated pentagonal double pyramid.

In an aspect, a variety of odd-sided dice can be made, in the shape of a double-pyramid having an even number of faces, which is truncated on one side to form one additional face. The shared base of each of the two pyramids can be a regular polygon with any number of sides, n. A first pyramid can extend upward from the base to meet at an upper tip, having n triangular faces. A second pyramid can extend downward from the shared base towards a lower tip, terminating at edges and forming a lower n-sided polygonal face. The overall polyhedral shape can comprise n triangular faces forming the upper pyramid, n quadrilateral faces form the truncated lower pyramid, and one n-sided polygonal face where the truncation occurs, resulting in a total of (2n+1) faces. FIG. 15A shows an example of a seven-sided truncated double triangular pyramid (n=3), FIG. 15B illustrates a top view of an example seven-sided die formed from a truncated triangular double pyramid, FIG. 16A shows an example of a nine-sided truncated double quadrilateral pyramid (n=4), FIG. 16B illustrates a top view of an example nine-sided die formed from a truncated square double pyramid, FIG. 17A shows an example of an eleven-sided truncated double pentagonal pyramid (n=5), and FIG. 17B illustrates a top view of an example eleven-sided die formed from a truncated pentagonal double pyramid.

The truncated double pyramid shapes described above share the following dimensions: a side length of the regular polygon which forms the shared base of the two pyramids L, a height of the upper pyramid $H_1$, a height that the lower pyramid would have were it not truncated $H_2$, and a height at which the truncation occurs $H_{trunc}$. Because four descriptors (i.e., L, $H_1$, $H_2$, and $H_{trunc}$) are used to describe the polyhedron, three ratios are needed to establish mathematical fairness (i.e, $H_1/L$, $H_2/L$, and $H_{trunc}/H_2$).

The truncated double pyramid shapes described above also share three types of faces: the triangular walls of the upper pyramid, the rectangular walls of the lower pyramid, and the n-sided polygon at the bottom. To achieve substantial mathematical fairness, the solid angle subtended by all three types of faces must be equal to $4\pi/(2n+1)$. In an aspect, one of the three ratios can be arbitrary and chosen to be aesthetically pleasing, while the numerical technique described above can be used to find the other two ratios. For example, in the case of the seven-sided truncated double triangular pyramid, if an $H_{trunc}/H_2$ of 0.35 is chosen, ratios of $H_1/L=0.33096$ and $H_2/L=0.824766$ make all solid angles equal. In the case of the nine-sided truncated double quadrilateral pyramid, if an $H_{trunc}/H_2$ of 0.45 is chosen, ratios of $H_1/L=0.51057$ and $H_2/L=0.98591$ make all solid angles equal. In the case of the eleven-sided truncated double pentagonal pyramid, if an $H_{trunc}/H_2$ of 0.45 is chosen, ratios of $H_1/L=0.83981$ and $H_2/L=1.43390$ make all solid angles equal.

The motion of a thrown die landing on a flat surface can involve a projectile motion of a center of mass, a rigid-body rotational motion of a die about its center of mass, an orientation of a point of first impact with a table, an angular momentum of the die with respect to the point of first impact, and the like. Depending on how the die is thrown and details of impact related to the throw, a die can bounce, slide, or tumble from one face to another before coming to rest. The disclosed methods use several simplifying assumptions. Namely: a) a trajectory and tumbling of a die in flight serves only to randomize the orientation of the die in three dimensions before impact, b) once a three dimensional orientation of a die is randomized, the rotation of the die can be assumed to be slow (e.g., negligible) compared to the vertical translation of the die (e.g., the die can be assumed to have a fixed orientation and can be falling straight downwards), c) gravity can pull downward from a center of mass of a die, and d) there is no upward bouncing or sliding of points on the die after they make impact.

In an aspect, a numerical simulation can be used to simulate a thrown die of a given shape and random orientation, therefore, computing a "landing" face. A die can land on whichever face is penetrated by a line pointing downward from a center of mass of the die. It therefore follows that the probability of landing on a given face of a die can be equal to a fraction of a total solid angle, which is subtended by the given face, when an origin of a coordinate system is defined to be at the center of mass of the die. Mathematical fairness occurs when all faces of a polyhedron subtend a same solid angle. For example, a five-sided square pyramid is fair when a square base subtends the same solid angle as each of the triangular walls: a solid angle of $4\pi/5$. Conditions for fairness can be similarly computed for other irregular polygons.

In an aspect, a real die can land in an orientation where the center of mass is above one face, but its angular momentum from a throw sends it eventually to another face. When a trajectory and tumbling of a thrown die in flight is not modeled, a throw can randomize orientation of a die in three dimensions before impact. For example, coordinates of a plurality of vertices for a square pyramid die can be determined, as shown in FIG. 1. To randomize orientation of the die, all coordinates of the plurality of vertices of the die can be transformed according to three randomly-generated intrinsic Euler angles: ($\alpha$, $\beta$, $\gamma$). To ensure uniform randomization over all $4\pi$ steradians, $\alpha$ and $\gamma$ can be drawn from a uniform distribution between 0 and 360 degrees, and $\beta$ can be drawn from a uniform distribution of $\cos(\beta)$ between −1 and 1.

In an aspect, rotation of a die can be assumed to be slow compared to vertical translation of the die. This means that a polyhedron can hold its orientation as it falls to a table, and a vertex with the lowest z-coordinate can hit the table first and be a first impact vertex. Once the first impact vertex is identified, an origin of a coordination system can be relocated to the first impact vertex.

Once a vertex has made contact with the table, this point can be assumed fixed. Gravity can continue to pull downward from the die's center of mass, causing the die as a whole to rotate towards the table, with the first impact vertex as a pivot point and about an axis defined as parallel to the table and perpendicular to the line connecting the first impact vertex to the center of mass.

Figure 18:
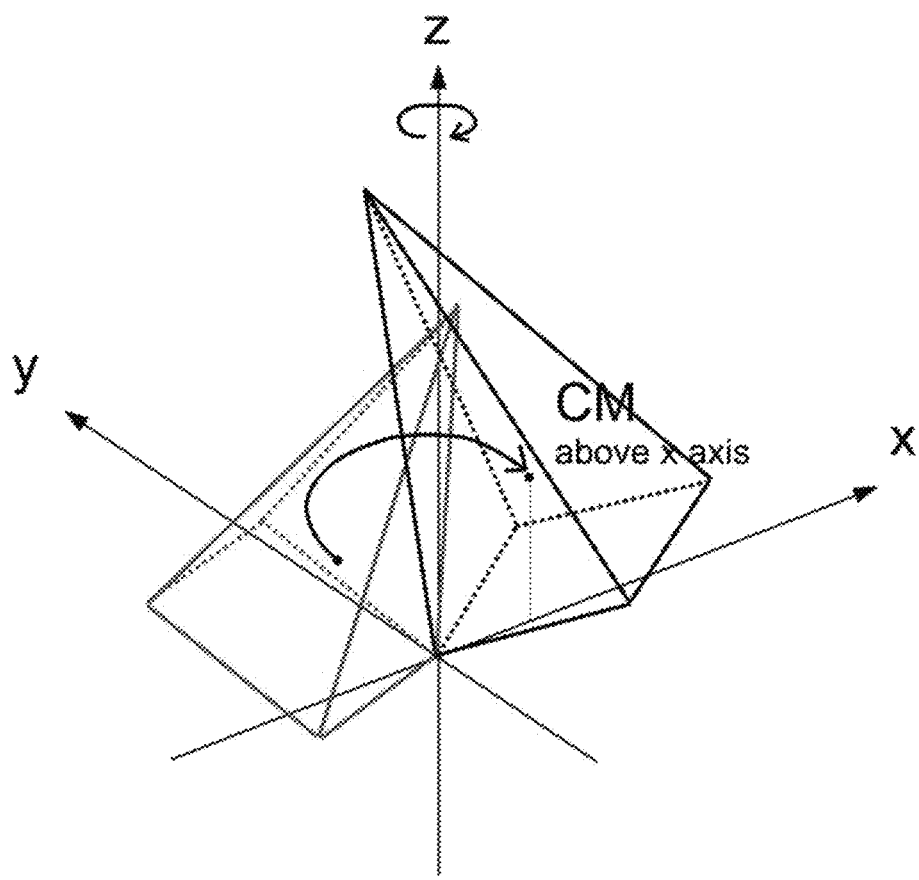
FIG. 18 illustrates an example center of mass alignment transformation.

In an aspect, a coordinate system can be rotated about the z-axis until the center of mass is aligned with the x-axis; this means that a falling action can be equivalent to rotation about the y-axis. The center of mass alignment transformation is shown in FIG. 18.

Figure 19:
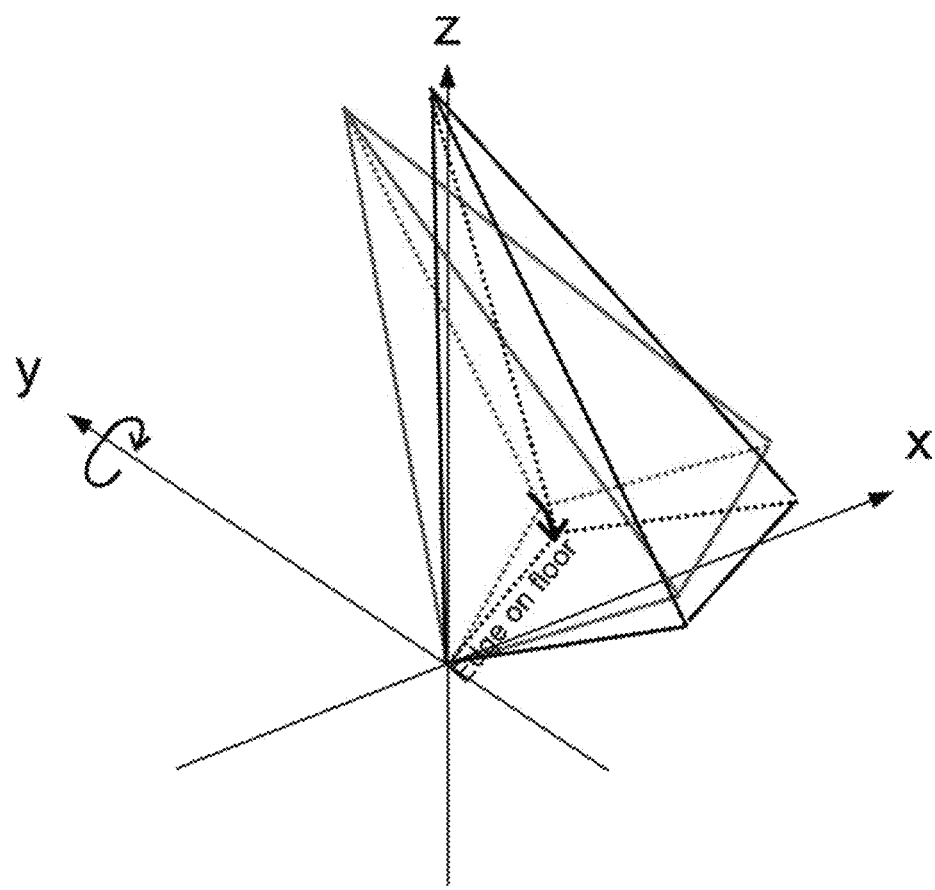
FIG. 19 illustrates an example system rotation about y-axis.

Once the center of mass alignment transformation is complete, a respective angle by which each of remaining vertices would have to fall to bring another vertex to the table can be computed. Whichever vertex has the least amount of room to fall $\theta_{min}$ can be the second impact vertex, which means the second impact vertex can hit the table after the first impact vertex. To perform the fall, the system can be rotated about the y-axis by $\theta_{min}$, as shown in FIG. 19. In this example, the second impact vertex is the corner of the square furthest from a viewer. After the rotation to bring the second impact vertex in contact with the table, the die is resting on one edge.

Figure 20:
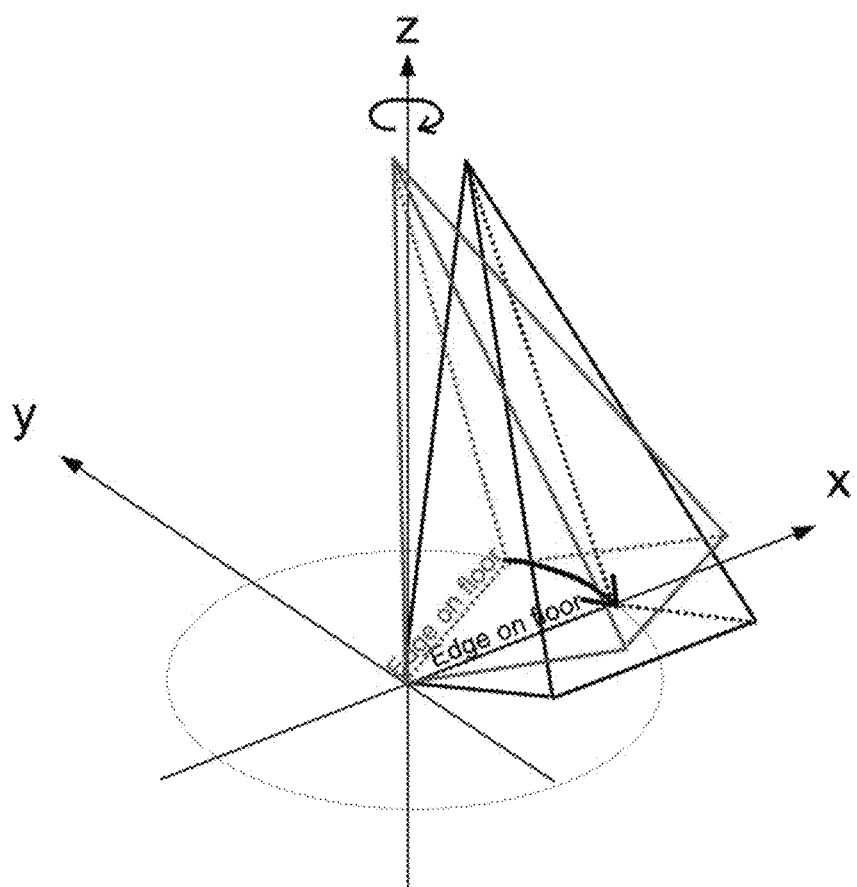
FIG. 20 illustrates an example system spun about z-axis.

Once two vertices are determined, the two vertices can be assumed fixed. Under a downward pull of gravity, the die can rotate about an axis defined by an edge upon which the die is resting. To calculate this, the coordinate system can be first spun about the z-axis in order to align the edge with the x-axis, as shown in FIG. 20.

In an aspect, the final fall of the die can be either a clockwise or a counterclockwise rotation about the x-axis, depending on which side the center of mass of the die is on. Once the transformation in FIG. 18 is complete, the angles that each of the remaining vertices and the center of mass has to fall can be computed. The vertex that is on the same side of the axis as the center of mass and has the shortest distance to fall can be a third impact vertex. Knowing these three vertices (i.e., the first impact vertex, the second impact vertex, and the third impact vertex) uniquely can determine which face of the polyhedron can land face-down. In an aspect, a plurality of potential values of the H/L ratio for a plurality of candidate polyhedrons can be scanned through. For each candidate polyhedron, a set of n independent simulations can be performed, in which the initial orientation of a die can be randomly generated, and three impact vertices determined. Thus, a landing face of the candidate polyhedron can be determined. As the number of samples n is increased, the results of the scan more closely resemble the curves in FIGS. 6, 9, 10, and 12, which is a valuable verification of both analytical technique and numerical technique.

In an aspect, a plurality of techniques can be used for computing the probabilities of a falling polyhedron landing on any of its faces. For example, the techniques can comprise an analytical calculation of solid angles subtended by a plurality of faces, a numerical calculation of solid angles, and a numerical simulation of the fall of a die after its orientation is randomized by flight. All of these techniques can use coordinates of the vertices and center of mass of the polyhedron as inputs. In an aspect, the analytical calculation and numerical calculation of a solid angle can be fast, but simulation of the fall can be adapted to include dynamical effects of a thrown die.

Figure 21:
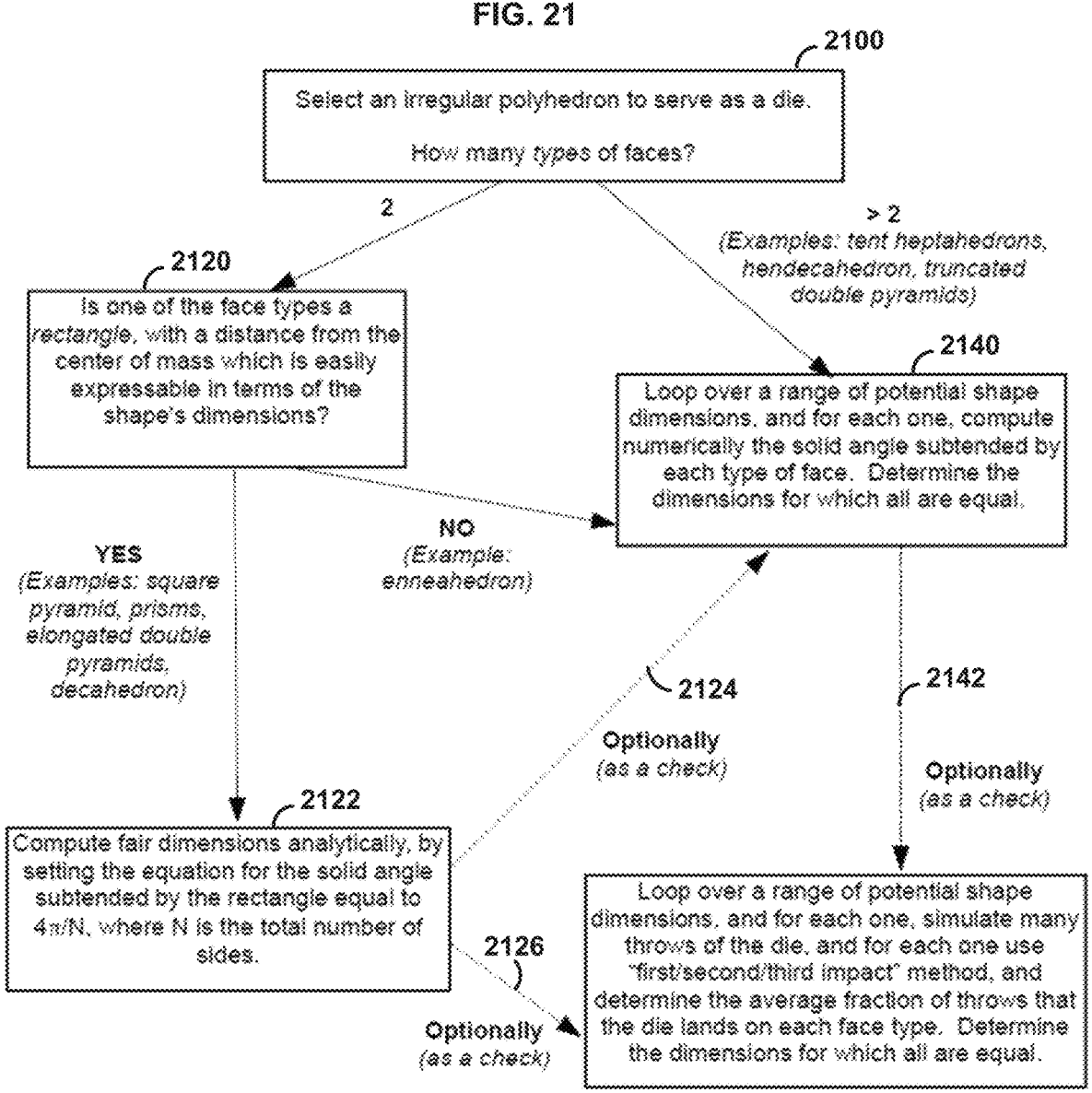
FIG. 21 is a flowchart illustrating an example method.

FIG. 21 is a flowcharting illustrating an example method. At step 2100, an irregular polyhedron can be selected to serve as a die. As an example, the irregular polyhedron can have five sides, seven sides, nine sides, ten sides, eleven side, fifteen sides, and the like. In an aspect, the irregular polyhedron can be formed as a solid, and is formed from a material having a uniform density. As an example, the selected irregular polyhedron can be a prism having two end faces that are regular polygons and a plurality of rectangular faces connecting the two end faces. In an aspect, when the irregular polyhedron is selected as a prism, the size of each face can be adjusted by adjusting a length L of each side of the regular polygon end-cap and a height H of each of the plurality of rectangular faces. For example, a five sided die can be designed, wherein a ratio H/L of the height H and the length L is about 0.533573. As another example, a seven sided die can be designed, wherein a ratio H/L of the height H and the length L is about 1.506038.

As a specific example, the irregular polyhedron can be a square pyramid, wherein the square pyramid can comprise a square base and four triangle sides. As another example, the irregular polyhedron can be a triangular prism, wherein the triangular prism can comprise two identical triangle end-caps and three rectangular sides, wherein the two triangle end-caps can be equilateral triangles. As another example, the irregular polyhedron can be a pentagonal prism, wherein the pentagonal prism can comprise two identical pentagonal end-caps and five rectangular sides, wherein the two pentagonal end-caps can be regular pentagons. As another example, the irregular polyhedron can be an enneahedron, wherein the enneahedron can comprise a first set of three pentagons joined at a first vertex, forming a bottom tip of the die, a second set of three pentagons joined at a second vertex, forming a top tip of the die, and three rhombus faces between the first set of three pentagons and the second set of three pentagons, wherein the three rhombus faces can join a plurality of sides of the first set of three pentagons and a plurality of sides of the second set of three pentagons. As another example, the irregular polyhedron can be a die wherein the number of sides is the product of 3n, where n is an integer greater than or equal to three, and the formation can comprise an elongated double pyramid by forming a central part of the shape from a prism formed by an n-sided polygon, attaching an upward-pointing n-cornered pyramid to the upper face of the prism, and attaching a downward-pointing n-cornered pyramid to the lower face of the prism. As another example, the irregular polyhedron can be a ten-sided die. The decahedron can be formed from two square faces and eight pentagonal faces. In particular, the two square faces are disposed opposite one another. As a further example, a variety of odd-sided dice can be chosen, in the shape of a truncated double-pyramid. Examples include a seven-sided truncated double triangular pyramid (n=3), a nine-sided truncated double quadrilateral pyramid (n=4), and an eleven-sided truncated double pentagonal pyramid (n=5). Additionally, as a further example, the irregular polyhedron can be a "hendecahedron," an eleven-sided polygon, that is formed from two triangular faces, three rhombus faces, and six quadrilateral faces.

At step 2120, if the irregular polyhedron die will have two types of faces, it is then determined whether one of the face types is a rectangle with a distance from the center of mass that is easily expressible in terms of the shape's dimensions. Examples can comprise a square pyramid, prisms, elongated double pyramids, decahedrons, and the like. If the shape is one which satisfies the criteria of step 2120, then, at step 2122, the mathematically fair dimensions can be computed by setting the equation discussed above for a solid angle subtended by the rectangle equal to $4\pi/N$, where N is the total number of sides. For example, a five-sided square pyramid is fair when a square base subtends a same solid angle as each of the triangular walls: a solid angle of $4\pi/5$. Conditions for fairness can be similarly computed for other irregular polygons. Optionally, a range of potential shape dimensions can be looped at step 2124, and for each shape the solid angle subtended by each of the faces can be computed, allowing a determination of which dimensions result in a shape where all solid angles subtended by each face are substantially equal.

Additionally, and also optional, at step 2126, a range of potential shape dimensions can be looped, and die throws can be simulated and analyzed for each shape using the impact methods described above. With the data collected, the average fraction of throws that the die lands on each face type can be computed in order to determine the dimensions for which the average for each face type is equal.

At step 2140, if the irregular polyhedron die will have greater than two types of faces, then a range of potential shape dimensions can be looped, and for each shape the solid angle subtended by each of the faces can be computed, allowing a determination of which dimensions result in a shape where all solid angles subtended by each face are equal.

Optionally, at step 2142, a range of potential shape dimensions can be looped, and die throws can be simulated and analyzed for each shape using the impact methods described above. With the data collected, the average fraction of throws that the die lands on each face type can be computed in order to determine the dimensions for which the average for each face type is equal. In an aspect, a size of each face of the irregular polyhedron can be selected such that a solid angle subtended by each of the faces from the center of mass of the selected irregular polyhedron is equal.

Figure 22:
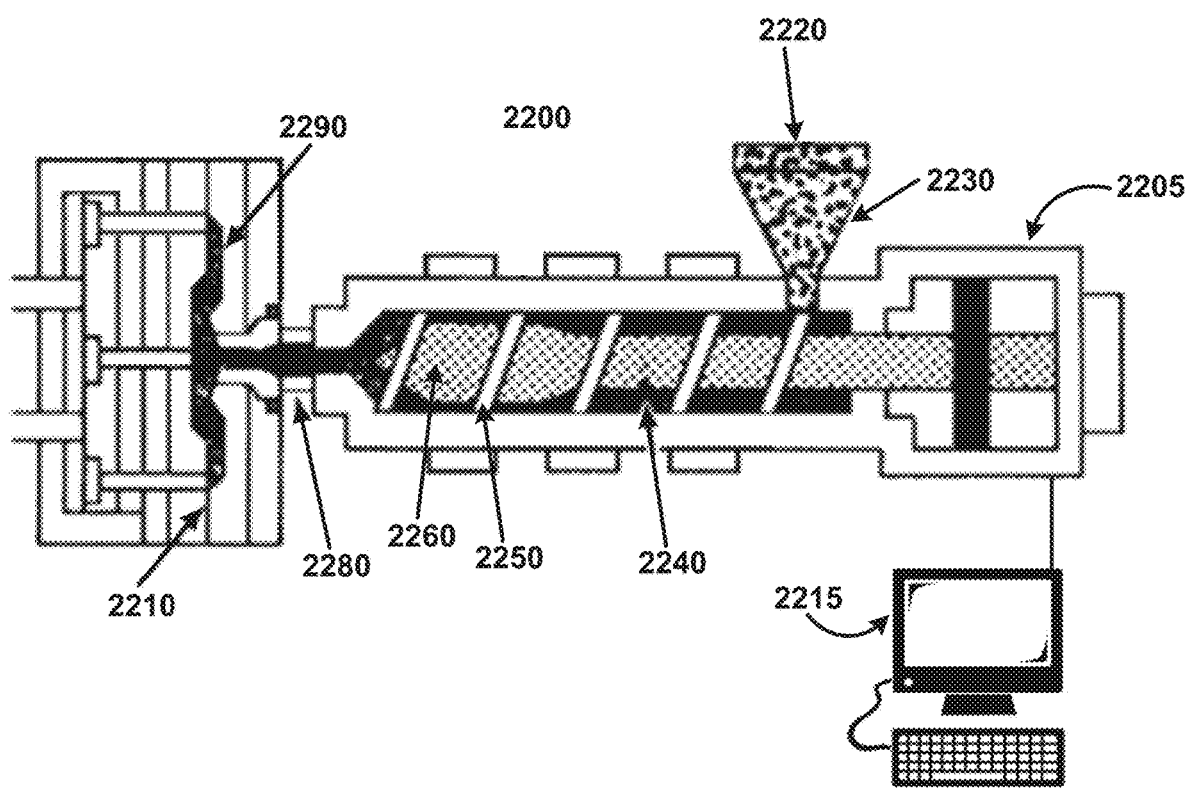
FIG. 22 illustrates an example system for manufacturing a die.

Turning now to FIG. 22, an example system 2200 for designing and manufacturing a mathematically fair n-sided die is depicted. The system 2200 can include a computing system 2215, which can be used to assist in designing a die and controlling an injection molding apparatus 2205 used to manufacture the die by an injection molding process. An injection mold 2210 having a mold chamber 2290 with specific dimensions for a particular die design can be loaded into the injection molding apparatus 2205. A quantity of solid polymer material 2230 can be loaded into the injection molding apparatus 2205 at a top opening 2220. The solid polymer material 2230 can be a high molecular weight polymers, such as a plastic (e.g., polymethyl methacrylate, cellulose plastics, etc.) having sufficient impact strength to tolerate impacts with a table and/or floor. The solid polymer material 2230 may be clear or may be colored with a colorant. Additionally, the solid polymer material 2230 may be manufactured with a variety of filler materials to increase workability and flexibility. Once the solid polymer material 2230 has entered through the top opening 2200 it then passes into a heating chamber 2240, which has a heating element 2250 coupled thereto. The heating element 2250 can cause the solid polymer material 2230 in the heating chamber to become molten polymer material 2260, which is then passed to an injection jet 2280 coupled to the heating chamber 2240. The injection jet 2280 in turn injects the molten polymer material 2260 into the mold chamber 2290, where it cools and returns to a solid form with a shape corresponding to the design of the die.

The mold chamber 2290 can comprise several dimensions corresponding to a particular design of a die. For example, the dimensions can comprise an elongated double pyramid, wherein a central part of the elongated double pyramid's shape includes a central prism formed by an s-sided polygon, which is an integer greater than or equal to three. The dimensions may further comprise an upward-pointing s-cornered pyramid attached to an upper face of the prism, and a downward-pointing s-cornered pyramid attached to a lower face of the prism, wherein the height of the central prism is n times the length of a side of the central prism, and wherein n and s are real numbers such that the die, when tossed, will land with a substantially equal probability on any side. Further, the central prism may comprise a triangular prism or a pentagonal prism, wherein the pentagonal prism comprises one or more pentagonal pyramids.

In another example, the dimensions of the mold chamber 2290 can comprise a polyhedron with a height n from two triangular faces, each with equal side lengths m, three rhombus faces, each with a width at a midpoint l, and six quadrilateral faces. A top cap of the polyhedron can have two top triangular faces, and a bottom cap of the polyhedron may have two bottom triangular faces. Additionally, the polyhedron may comprise a plurality of triangular face edges, each being joined to an edge of at least one of the six quadrilateral faces, wherein each of the six quadrilateral faces has an opposite edge at an equator of the polyhedron and edges of the six quadrilateral faces create the three rhombus faces, and wherein n, m, and l are real numbers such that the die, when tossed, will land with equal probability on any side.

In a further example, the dimensions of the mold chamber 2290 can comprise a double-pyramid polyhedron, wherein a first pyramid of the double-pyramid has a height l, a shared base of the double-pyramid is a regular polygon having a side length m, and a second pyramid of the double-pyramid is truncated to form one additional face having a height n at the point where it is truncated and a height o of the second pyramid before it is truncated. The shape of the double-pyramid polyhedron can have an odd number of faces that comprise at least three triangular faces formed by extending the first pyramid upward from the shared base, at least three quadrilateral faces formed by the truncated side of the double-pyramid, and one polygonal face formed by the truncated side of the double-pyramid. The first pyramid may be extended upward from the shared base to meet at an upper tip, creating a triangular face, and the second pyramid may be extended downward from the shared base towards a lower tip, terminating at edges and forming a lower polygonal face. The value of l, m, n and o may be real numbers such that the die will land with equal probability on any side.

In still a further example, the mold chamber 2290 can comprise a dimensions including an upper point of an enneahedron, which is formed from three pentagons having tips converging at an upper vertex, wherein the dimensions of the three pentagons are congruent with one another. A lower point of the enneahedron can be formed from another three pentagons with tips converging at a lower vertex, wherein the other three pentagons are congruent with one another and the lower point is opposite the upper point. Further, each side of the upper point can be joined with at least one rhombus selected from a set of three rhombi, and each of the three rhombi can be joined to a plurality of sides of the three pentagons and a plurality of sides of a second set of three pentagons, wherein the diagonal width of the rhombus sides is n times a maximum rhombus width, and the distance between the upper and lower points of the enneahedron is m times the maximum rhombus width, wherein n and m are a real numbers such that the die, when tossed, will land with substantially equal probability on any side.

Figure 23:
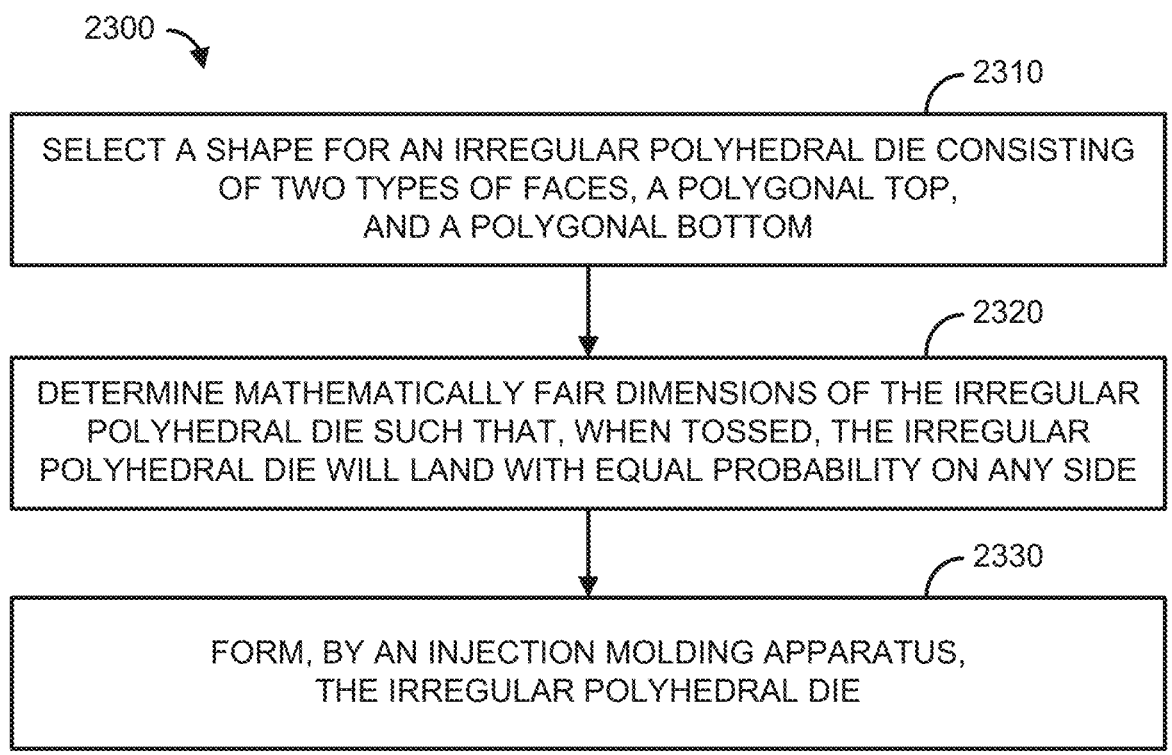
FIG. 23 is a flowchart diagram of an example method.

FIG. 23 depicts an example method 2300 of designing and manufacturing an irregular polyhedral die. At step 2310 a shape for an irregular polyhedral die is selected. The shape of the irregular polyhedral die may consist of two types of faces, a polygonal top, and a polygonal bottom. One of the two types of faces can be a rectangle positioned a predetermined distance from a center of mass of the irregular polyhedral die such that the predetermined distance may or may not be expressed in terms of one or more dimensions of the irregular polyhedral die. Further, the polygonal top and the polygonal bottom of the irregular polyhedral die may each subtend a solid angle that is equal to a solid angle subtended by each face of the irregular polyhedral die. At step 2320, mathematically fair dimensions of the irregular polyhedral die can be determined such that a height of the polygonal top, a length of the polygonal top, a height of the polygonal bottom, a length of the polygonal bottom, the predetermined distance, and values of the subtended solid angles are such that the irregular polyhedral die, when tossed, will land with equal probability on any side. At step 2330, the irregular polyhedral die can be formed by an injection molding apparatus (e.g., injection molding apparatus 2205). The irregular polyhedral die may be composed of a polymer material, and it may be solid, with uniform density, or it may be hollow. Further, the irregular polyhedral die may be five-sided, seven-sided, eleven-sided, or it may be shaped as an enneahedron. In other aspects, the irregular polyhedral die can be formed using a lathe rather than an injection molding apparatus.

In an aspect, the computing system 2215 may be similar to computer 2401. Additionally, in another aspect, the method 2300 can be implemented on computer 2401. Computer 2401 can be operational with numerous general purpose or special purpose computing system environments or configurations. Examples of well-known computing systems, environments, and/or configurations that can be suitable for use with computer 2401 comprise, but are not limited to, personal computers, server computers, laptop devices, and/or multiprocessor systems. Additional examples comprise network PCs, minicomputers, mainframe computers, distributed computing environments that comprise any of the above systems or devices, and the like.

Computer 2401 can use software components, when implementing the disclosed methods and systems. Further, the disclosed methods and systems can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods and systems can also be practiced in distributed computing environments where tasks are performed by remote processing devices that are linked through a communications network. In a distributed computing environment, program modules can be located in both local and remote computer storage media including memory storage devices.

The components of the computer 2401 can comprise, but are not limited to, one or more processors 2403, a system memory 2412, and a system bus 2413 that couples various system components including the one or more processors 2403 to the system memory 2412. The system can utilize parallel computing. The system distribution bus 2413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Distribution bus (USB) and the like. The bus 2413, and all buses specified in this description can also be implemented over a wired or wireless network connection and each of the subsystems, including the one or more processors 2403, a mass storage device 2404, an operating system 2405, software 2406, data 2407, a network adapter 2408, the system memory 2412, an Input/Output Interface 2410, a display adapter 2409, a display device 2411, and a human machine interface 2402, in effect implementing a fully distributed system.

The computer 2401 typically comprises a variety of computer readable media. Exemplary readable media can be any available media that is accessible by the computer 2401 and comprises, for example and not meant to be limiting, both volatile and non-volatile media, removable and non-removable media. The system memory 2412 comprises computer readable media in the form of volatile memory, such as random access memory (RAM), and/or non-volatile memory, such as read only memory (ROM). The system memory 2412 typically contains data such as the data 307 and/or program modules such as the operating system 2405 and the software 2406 that are immediately accessible to and/or are presently operated on by the one or more processors 2403.

Figure 24:
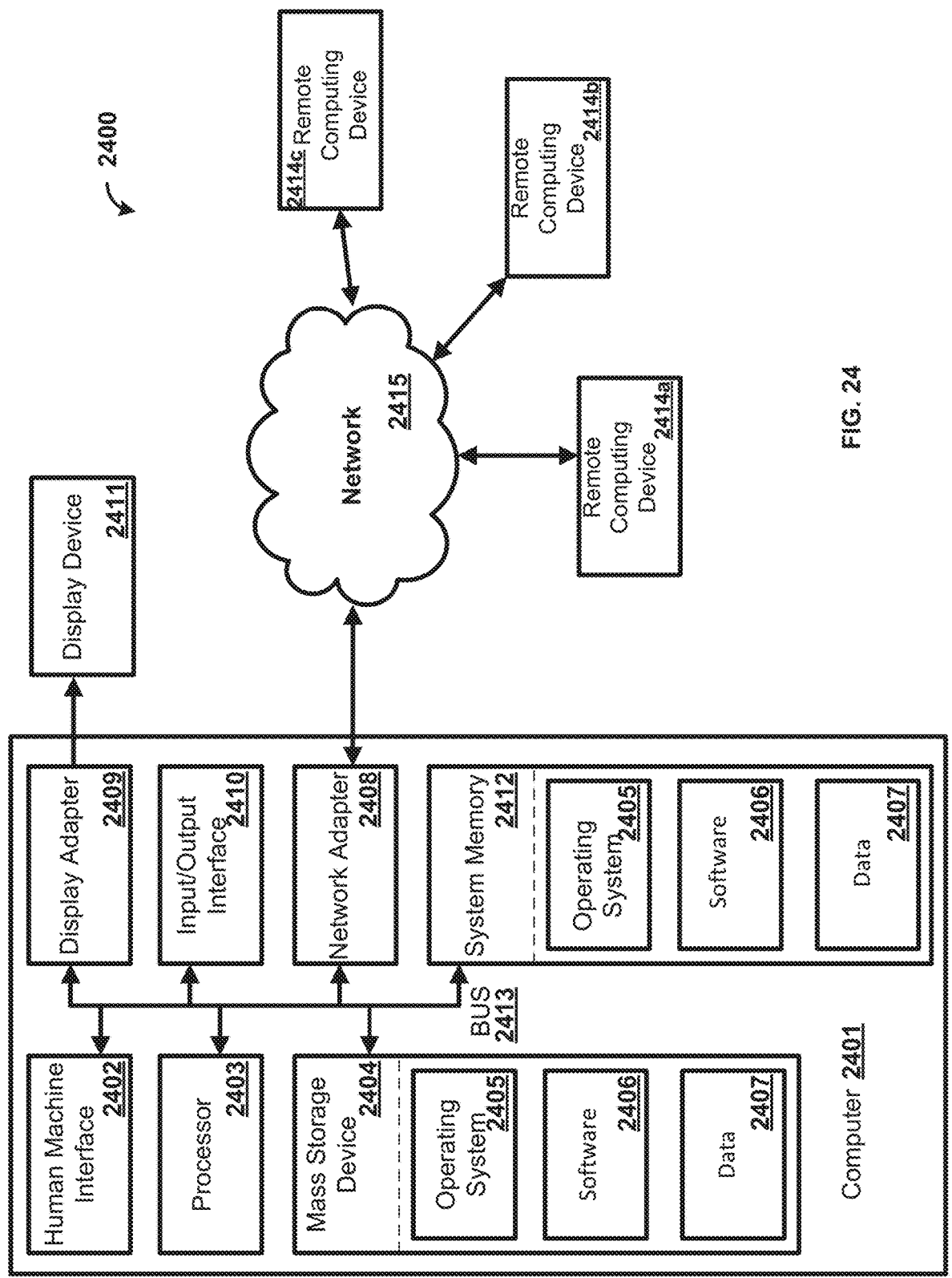
FIG. 24 is a block diagram of an exemplary computing device.

In another aspect, the computer 2401 can also comprise other removable/non-removable, volatile/non-volatile computer storage media. By way of example, FIG. 24 illustrates the mass storage device 2404 which can provide non-volatile storage of computer code, computer readable instructions, data structures, program modules, and other data for the computer 2401. For example and not meant to be limiting, the mass storage device 2404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2404, including by way of example, the operating system 2405 and the software 2406. Each of the operating system 2405 and the software 2406 (or some combination thereof) can comprise elements of the programming and the software 2406. The data 2407 can also be stored on the mass storage device 2404. The data 2407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2403 via the human machine interface 2402 that is coupled to the system distribution bus 2413, but can be connected by other interface and distribution bus structures, such as a parallel port, game port, an IEEE 1394 Port (also known as a Firewire port), a serial port, or a universal serial bus (USB).

In yet another aspect, the display device 311 can also be connected to the system bus 2413 via an interface, such as the display adapter 309. It is contemplated that the computer 2401 can have more than one display adapter 309 and the computer 2401 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 2401 via the Input/Output Interface 2410. Any step and/or result of the methods can be output in any form to an output device. Such output can be any form of visual representation, including, but not limited to, textual, graphical, animation, audio, tactile, and the like. The display 2411 and computer 2401 can be part of one device, or separate devices.

The computer 2401 can operate in a networked environment using logical connections to one or more remote computing devices 2414*a,b,c*. By way of example, a remote computing device can be a personal computer, portable computer, smartphone, a server, a router, a network computer, a peer device or other common network node, and so on. Logical connections between the computer 2401 and a remote computing device 2414*a,b,c* can be made via a network 2415, such as a local area network (LAN) and/or a general wide area network (WAN). Such network connections can be through the network adapter 2408. The network adapter 2408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2405 are illustrated herein as discrete blocks, although it is recognized that such programs and components reside at various times in different storage components of the computing device 2401, and are executed by the one or more processors 2403 of the computer. An implementation of the software 2406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media."

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for manufacturing a die comprising:
a first injection mold comprising a chamber, wherein the chamber comprises:
an upper point of an enneahedron, formed from three pentagons having tips converging at an upper vertex, wherein the dimensions of the three pentagons are congruent with one another;
a lower point of the enneahedron, formed from another three pentagons with tips converging at a lower vertex, wherein the other three pentagons are congruent with one another, and wherein the lower point is opposite the upper point;
each side of the upper point joined with at least one rhombus selected from a set of three rhombi; and
each of the three rhombi joined to a plurality of sides of the three pentagons and a plurality of sides of a second set of three pentagons, wherein the diagonal width of the rhombus sides is n times a maximum rhombus width, and the distance between the upper and lower points of the enneahedron is in times the maximum rhombus width, wherein n and m are a real numbers such that the die, when tossed, will land with substantially equal probability on any side; and
an injection molding apparatus comprising:
a top opening having dimensions suitable for passing a quantity of solid polymer material into a heating chamber, wherein the heating chamber is coupled to the top opening;
a heating element coupled to the heating chamber, wherein the heating element causes the quantity of solid polymer material in the heating chamber to become molten polymer material; and
an injection jet coupled to the heating chamber having dimensions suitable for passing a quantity of the molten polymer material through a head of the injection jet and into the chamber.

2. The system of claim 1, wherein the chamber comprises:
an elongated double pyramid, wherein a central part of the elongated double pyramid's shape comprises a central prism formed by an s-sided polygon, wherein s is an integer equal to three;
an upward-pointing s-cornered pyramid attached to an upper face of the prism; and a downward-pointing s-cornered pyramid attached to a lower face of the prism, wherein the height of the central prism is n times the length of a side of the central prism, and wherein n and s are real numbers such that the die, when tossed, will land with a substantially equal probability on any side.

3. The system of claim 1, wherein the die comprises the molten polymer material.

4. The system of claim 1, wherein the die is solid.

5. The system of claim 1, wherein the die is hollow.

6. The system of claim 1, further comprising:
a second injection mold having a second chamber corresponding to a second die, wherein the dimensions of the second chamber comprises: a polyhedron with a height n from two triangular faces, each with equal side lengths m, three rhombus faces, each with a width at the midpoint l, and six quadrilateral faces; a top cap of the polyhedron having two top triangular faces; a bottom cap of the polyhedron having two bottom triangular faces;
and a plurality of triangular face edges, each being joined to an edge of at least one of the six quadrilateral faces, wherein each of the six quadrilateral faces has an opposite edge at an equator of the polyhedron and edges of the six quadrilateral faces create the three rhombus faces, and wherein n, in, and l are real numbers such that the second die, when tossed, will land with equal probability on any side.

7. The system of claim 6, wherein the second die is eleven-sided.

8. The system of claim 1, further comprising:
a third injection mold having a third chamber corresponding to a third die, wherein the dimensions of the third chamber comprises: a double-pyramid polyhedron, wherein a first pyramid of the double-pyramid has a height l, a shared base of the double-pyramid is a regular polygon having a side length m, and a second pyramid of the double-pyramid, the second pyramid being truncated to form one additional face having a height n at the point where it is truncated and a height o, representing a height of the second pyramid before it is truncated; the first pyramid extended upward from the shared base to meet at an upper tip, creating at least one triangular face: and the second pyramid extended downward from the shared base towards a lower tip, terminating at edges and forming a lower polygonal face, wherein l, m, n and o are real numbers such that the third die will land with equal probability on any side.

9. The system of claim 8, wherein the shape of the double-pyramid polyhedron has an odd number of faces that comprise at least three triangular faces formed by extending the first pyramid upward from the shared base, at least three quadrilateral faces formed by the truncated side of the double-pyramid, and one polygonal face formed by the truncated side of the double-pyramid.

10. A method for manufacturing a die comprising:
selecting a first injection mold comprising a chamber, wherein the chamber comprises:
an upper point of an enneahedron, formed from three pentagons having tips converging at an upper vertex, wherein the dimensions of the three pentagons are congruent with one another;
a lower point of the enneahedron, formed from another three pentagons with tips converging at a lower vertex, wherein the other three pentagons are congruent with one another, and wherein the lower point is opposite the upper point;
each side of the upper point joined with at least one rhombus selected from a set of three rhombi; and
each of the three rhombi joined to a plurality of sides of the three pentagons and a plurality of sides of a second set of three pentagons, wherein the diagonal width of the rhombus sides is n times a maximum rhombus width, and the distance between the upper and lower points of the enneahedron is m times the maximum rhombus width, wherein n and m are a real numbers such that the die, when tossed, will land with substantially equal probability on any side; and
providing, via an injection jet of an injection molding apparatus, a quantity of molten polymer material into the chamber, wherein the molten polymer material passes through the injection jet into the chamber to form the die.

11. The method of claim 10, wherein the chamber comprises:
an elongated double pyramid, wherein a central part of the elongated double pyramid's shape comprises a central prism formed by an s-sided polygon, wherein s is an integer equal to three;
an upward-pointing s-cornered pyramid attached to an upper face of the prism; and a downward-pointing s-cornered pyramid attached to a lower face of the prism, wherein the height of the central prism is n times the length of a side of the central prism, and wherein n and s are real numbers such that the die, when tossed, will land with a substantially equal probability on any side.

12. The method of claim 10, wherein the die comprises the molten polymer material.

13. The method of claim 10, wherein the die is solid.

14. The method of claim 10, wherein the die is hollow.

15. The method of claim 10, further comprising:
a second injection mold having a second chamber corresponding to a second die, wherein the dimensions of the second chamber comprises: a polyhedron with a height n from two triangular faces, each with equal side lengths m, three rhombus faces, each with a width at the midpoint l, and six quadrilateral faces;
a top cap of the polyhedron having two top triangular faces; a bottom cap of the polyhedron having two bottom triangular faces; and a plurality of triangular face edges, each being joined to an edge of at least one of the six quadrilateral faces,
wherein each of the six quadrilateral faces has an opposite edge at an equator of the polyhedron and edges of the six quadrilateral faces create the three rhombus faces, and wherein n, in, and l are real numbers such that the second die, when tossed, will land with equal probability on any side.

16. The method of claim 15, wherein the second die is eleven-sided.

17. The method of claim 10, further comprising:
a third injection mold having a third chamber corresponding to a third die, wherein the dimensions of the third chamber comprises:
a double-pyramid polyhedron, wherein a first pyramid of the double-pyramid has a height l, a shared base of the double-pyramid is a regular polygon having a side length m, and a second pyramid of the double-pyramid, the second pyramid being truncated to form one additional face having a height n at the point where it is truncated and a height o, representing a height of the second pyramid before it is truncated;
the first pyramid extended upward from the shared base to meet at an upper tip, creating at least one triangular face: and the second pyramid extended downward from the shared base towards a lower tip, terminating at edges and forming a lower polygonal face, wherein l, m, n and o are real numbers such that the third die will land with equal probability on any side.

18. The method of claim 17, wherein the shape of the double-pyramid polyhedron has an odd number of faces that comprise at least three triangular faces formed by extending the first pyramid upward from the shared base, at least three quadrilateral faces formed by the truncated side of the double-pyramid, and one polygonal face formed by the truncated side of the double-pyramid.

* * * * *